US012793625B2

(12) United States Patent
Hwang et al.

(10) Patent No.: US 12,793,625 B2
(45) Date of Patent: Nov. 10, 2026

(54) DISPLAY DEVICE AND TILED DISPLAY DEVICE

(71) Applicant: SAMSUNG DISPLAY CO., LTD., Yongin-si (KR)

(72) Inventors: Jung Hwan Hwang, Yongin-si (KR); Min Chul Shin, Yongin-si (KR); Sung Hwan Kim, Yongin-si (KR); Ji Youn Seo, Yongin-si (KR); Kye Uk Lee, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 19/294,209

(22) Filed: Aug. 7, 2025

(65) Prior Publication Data

US 2025/0363941 A1 Nov. 27, 2025

Related U.S. Application Data

(63) Continuation of application No. 18/473,879, filed on Sep. 25, 2023, now abandoned.

(30) Foreign Application Priority Data

Dec. 23, 2022 (KR) ........................ 10-2022-0183633

(51) Int. Cl.
*G09G 3/325* (2016.01)
*G09G 3/32* (2016.01)

(52) U.S. Cl.
CPC ......... *G09G 3/32* (2013.01); *G09G 2300/026* (2013.01); *G09G 2310/0275* (2013.01); *G09G 2310/08* (2013.01); *G09G 2320/0233* (2013.01)

(58) Field of Classification Search
CPC ............. G09G 3/32; G09G 2310/0275; G09G 2320/0233; G09G 3/3208; G09G 3/3233; G09G 3/325; G09G 3/3258; G09G 3/3275
See application file for complete search history.

(56) References Cited

U.S. PATENT DOCUMENTS 11,688,331 B2 6/2023 Hwang et al.
2019/0371231 A1 12/2019 Kim et al.
(Continued)

FOREIGN PATENT DOCUMENTS

CN 111179853 B 3/2021
KR 10-2022-0060457 A 5/2022
(Continued)

OTHER PUBLICATIONS

Extended European Search Report dated Feb. 8, 2024 for corresponding European Application No. 23214805.6 (10 pages).

*Primary Examiner* — Dennis P Joseph
(74) *Attorney, Agent, or Firm* — Womble Bond Dickinson (US) LLP

(57) ABSTRACT

A display device includes first sub-pixels, each of the first sub-pixels including a first light emitting element of a first color, and at least one of the first sub-pixels includes a first circuit unit configured to control a supply period of a driving current in response to a first data signal supplied from a first data line, a second circuit unit configured to supply the driving current to the first light emitting element in response to a second data signal supplied from a second data line, and a sensing transistor connected between a first electrode of the first light emitting element and the second data line, and having a gate electrode connected to a sensing line.

23 Claims, 16 Drawing Sheets

(56) References Cited

U.S. PATENT DOCUMENTS

| | | | | |
|---|---|---|---|---|
| 2021/0210002 | A1* | 7/2021 | Kim | G09G 3/32 |
| 2021/0210003 | A1 | 7/2021 | Kim et al. | |
| 2022/0114951 | A1 | 4/2022 | Chang et al. | |
| 2022/0225481 | A1 | 7/2022 | Jung et al. | |
| 2022/0319397 | A1 | 10/2022 | Kim et al. | |
| 2023/0178012 | A1 | 6/2023 | Kim et al. | |

FOREIGN PATENT DOCUMENTS

| | | | |
|---|---|---|---|
| KR | 10-2022-0102870 | A | 7/2022 |
| TW | I719815 | B | 2/2021 |
| WO | WO 2022/059933 | A1 | 3/2022 |

* cited by examiner

DISPLAY DEVICE AND TILED DISPLAY DEVICE

CROSS-REFERENCE TO RELATED APPLICATIONS

This application is a continuation of U.S. patent application Ser. No. 18/473,879, filed Sep. 25, 2023, which claims priority to and the benefit of Korean Patent Application No. 10-2022-0183633, filed on Dec. 23, 2022, the entire content of both of which is incorporated herein by reference.

BACKGROUND

1. Field

The present disclosure relates to a display device and a tiled display device.

2. Description of the Related Art

As information technology is developed, importance of a display device, which is a connection medium between a user and information, has been highlighted. In response to this, use of a display device such as a liquid crystal display device and an organic light emitting display device is increasing.

According to a demand for enlargement of a display device, a tiled display device using a plurality of display devices is being used. The tiled display device displays an image by combining the plurality of display devices, and thus uniformity of pixels included in each display device is required.

SUMMARY

Aspects and features of embodiments of the present disclosure are drawn to provide a display device and a tiled display device capable of compensating for dispersion of circuit elements positioned in a current path through which a current is supplied to a light emitting element.

According to one or more embodiments of the present disclosure, a display device includes first sub-pixels, each of the first sub-pixels including a first light emitting element of a first color, and at least one of the first sub-pixels includes a first circuit unit configured to control a supply period of a driving current in response to a first data signal supplied from a first data line, a second circuit unit configured to supply the driving current to the first light emitting element in response to a second data signal supplied from a second data line, and a sensing transistor connected between a first electrode of the first light emitting element and the second data line, and having a gate electrode connected to a sensing line.

According to one or more embodiments, the first data signal has different voltages corresponding to gray levels to be expressed.

According to one or more embodiments, the second data signal is set so that light of substantially a same luminance is generated by the first light emitting element in each of the first sub-pixels.

According to one or more embodiments, the display device further includes a first data driver configured to receive first output data corresponding to a gray level and supply the first data signal generated in response to the first output data to the first data line, a second data driver configured to receive second output data and supply the second data signal generated in response to the second output data to the second data line, and a timing controller configured to generate the first output data in response to input data input from an outside and generate the second output data based on sensing data stored therein.

According to one or more embodiments, the timing controller is configured to generate the second output data so that the second data signal of different voltages are supplied to at least two first sub-pixels from among the first sub-pixels in response to the sensing data.

According to one or more embodiments, the second data signal of the different voltages is set so that light of substantially a same luminance is generated in the first light emitting element in each of the two first sub-pixels.

According to one or more embodiments, the second data driver includes a data signal generator configured to supply the second data signal generated based on the second output data to the second data line during a normal period, and to supply reference power as the second data signal to the second data line during a first period of a sensing period, and a sensing unit configured to generate the sensing data based on a sensing voltage from the sensing transistor during a second period of the sensing period except for the first period of the sensing period, and to supply the sensing data to the timing controller.

According to one or more embodiments, the sensing unit is configured to detect mobility of circuit elements positioned in a current path of the driving current using a slope of the sensing voltage, and the sensing data include mobility information.

According to one or more embodiments, the display device further includes a data switch connected between the second data line and the data signal generator and turned on during the normal period and the first period of the sensing period, and a sensing switch connected between the second data line and the sensing unit and turned on during the second period of the sensing period.

According to one or more embodiments, the first data driver is configured to supply the first data signal corresponding to a highest gray level to the first data line during the sensing period.

According to one or more embodiments, a voltage of the reference power is set so that a second driving transistor in the second circuit unit is turned on.

According to one or more embodiments, the first circuit unit includes a first driving transistor having a gate electrode connected to a first node, a first electrode connected to a second node, and a second electrode connected to a third node, a second transistor having a gate electrode connected to a scan line, a first electrode connected to the first data line, and a second electrode connected to the second node, a third transistor having a gate electrode connected to the scan line, a first electrode connected to the third node, and a second electrode connected to the first node, a fourth transistor having a gate electrode connected to a first initialization line, a first electrode connected to the first node, and a second electrode connected to a fourth power line, and a first capacitor having a first electrode connected to a sweep line and a second electrode connected to the first node.

According to one or more embodiments, the first circuit unit further includes a fifth transistor having a gate electrode connected to a first emission control line, a first electrode connected to a first power line, and a second electrode connected to the second node, a sixth transistor having a gate electrode connected to the first emission control line, a first electrode connected to the third node, and a second electrode connected to a fourth node, a seventh transistor having a gate electrode connected to a second initialization line, a first electrode connected to the fourth node, and a second electrode connected to the fourth power line, and an eighth transistor having a gate electrode connected to the second initialization line, a first electrode connected to the sweep line, and a second electrode connected to a fifth power line.

According to one or more embodiments, the second circuit unit includes a second driving transistor having a gate electrode connected to a fifth node, a first electrode connected to a sixth node, and a second electrode connected to a seventh node, a tenth transistor having a gate electrode connected to the scan line, a first electrode connected to the second data line, and a second electrode connected to the sixth node, an eleventh transistor having a gate electrode connected to the scan line, a first electrode connected to the seventh node, and a second electrode connected to the fifth node, a twelfth transistor having a gate electrode connected to the first initialization line, a first electrode connected to the fifth node, and a second electrode connected to the fourth power line, a thirteenth transistor having a gate electrode connected to the first emission control line, a first electrode connected to a second power line, and a second electrode connected to the sixth node, and a fourteenth transistor having a gate electrode connected to a second emission control line, a first electrode connected to the seventh node, and a second electrode connected to a first electrode of the first light emitting element.

According to one or more embodiments, the second circuit unit further includes a second capacitor connected between the fourth node and the fifth node, and an eighteenth transistor having a gate electrode connected to the second initialization line, a first electrode connected to the first electrode of the first light emitting element, and a second electrode connected to a second electrode of the first light emitting element and a third power line.

According to one or more embodiments, the second circuit unit further includes a second capacitor having a first electrode, and a second electrode connected to the fifth node, a fifteenth transistor connected between the seventh node and the fourteenth transistor, and having a gate electrode connected to the fourth node, a sixteenth transistor having a gate electrode connected to the first emission control line, a first electrode connected to the second power line, and a second electrode connected to the first electrode of the second capacitor, a seventeenth transistor having a gate electrode connected to the second initialization line, a first electrode connected to the first power line, and a second electrode connected to the first electrode of the second capacitor, and an eighteenth transistor having a gate electrode connected to the second initialization line, a first electrode connected to a first electrode of the first light emitting element, and a second electrode connected to a second electrode of the first light emitting element and a third power line.

According to one or more embodiments, the display device further includes second sub-pixels, each of the second sub-pixels including a second light emitting element of a second color different from the first color.

According to one or more embodiments of the present disclosure, a tiled display device includes a plurality of display devices, and a seam portion between the plurality of display devices, a first display device from among the plurality of display devices includes first sub-pixels, each of the first sub-pixels including a first light emitting element of a first color, and second sub-pixels, each of the second sub-pixels including a second light emitting element of a second color different from the first color, and each of the first sub-pixels includes a first circuit unit configured to control a supply period of a driving current in response to a first data signal supplied from a first data line, a second circuit unit configured to supply the driving current to the first light emitting element in response to a second data signal supplied from a second data line, and a sensing transistor connected between a first electrode of the first light emitting element and the second data line, and having a gate electrode connected to a sensing line.

According to one or more embodiments, the first light emitting element and the second light emitting element are flip chip type of micro light emitting diode elements.

According to one or more embodiments, the first display device further includes a substrate supporting the first sub-pixels and the second sub-pixels on a first surface.

According to one or more embodiments, the first display device further includes a pad on the first surface of the substrate, a connection line on a second surface opposite to the second surface of the substrate, and a side line connecting the pad and the connection line while covering a portion of a side surface of the substrate.

According to one or more embodiments, the tiled display device further includes a flexible film on the second surface of the substrate and electrically connected to the side line.

According to one or more embodiments, a source driving circuit including a first data driver configured to supply the first data signal to the first data line and a second data driver configured to supply the second data signal to the second data line located on the flexible film.

Aspects and features of embodiments of the disclosure are not limited to the described aspects and features, and other technical aspects and features that are not described will be clearly understood by those skilled in the art from the following description.

The display device and the tiled display device according to embodiments of the present disclosure may compensate for a data signal of a PAM circuit by reflecting distribution of circuit elements positioned in a current path, and thus secure uniformity of sub-pixels.

However, effects, aspects, and features of the present disclosure are not limited to the above-described effects, aspects, and features and may be variously extended within a range that does not deviate from the spirit and scope of the present disclosure.

BRIEF DESCRIPTION OF THE DRAWINGS

The above and other features of the present disclosure will become more apparent by describing in further detail embodiments thereof with reference to the accompanying drawings, in which.

DETAILED DESCRIPTION

Figure 1:
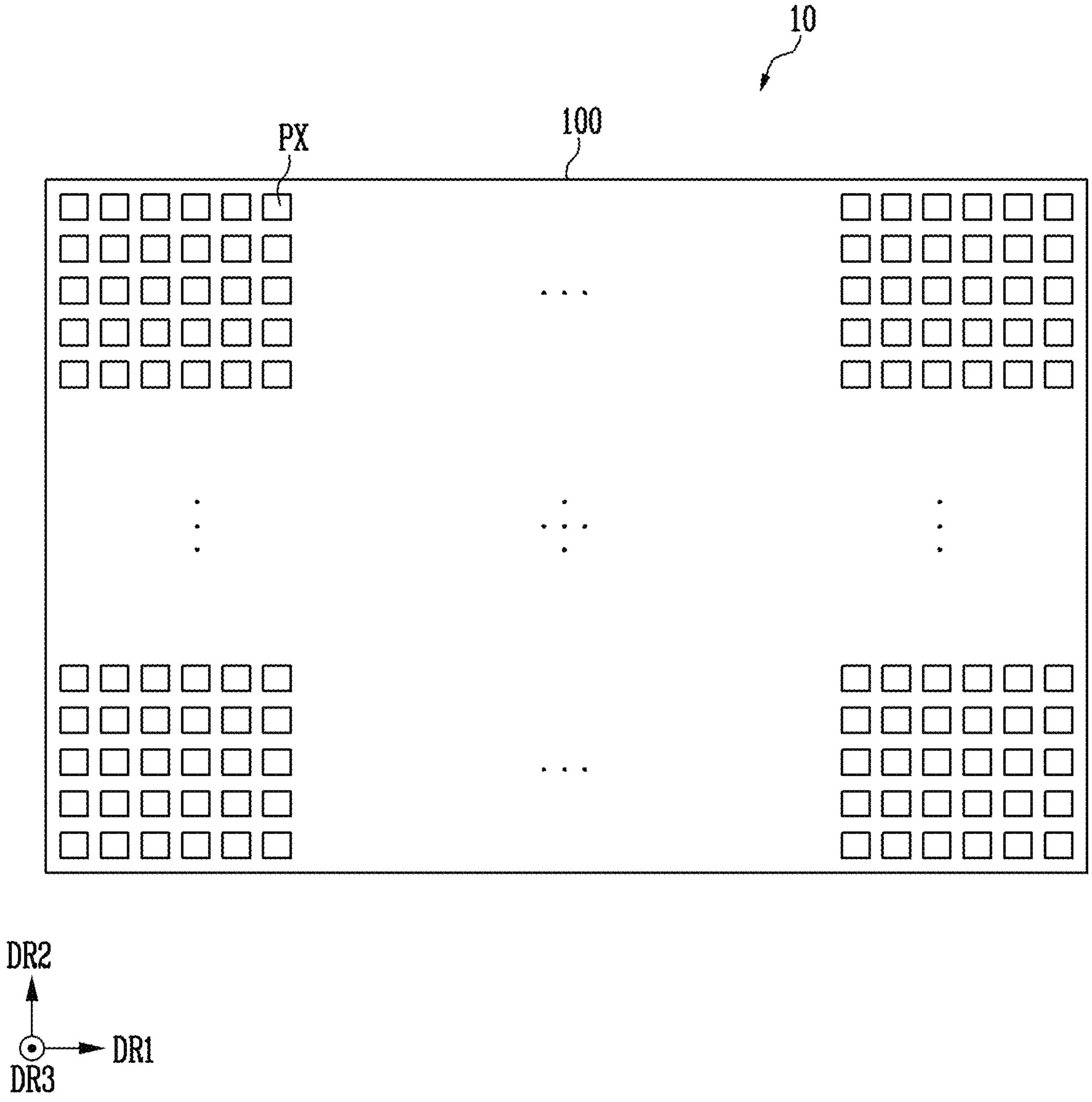
FIG. 1 is a plan view illustrating a display device according to one or more embodiments of the present disclosure.

Hereinafter, various embodiments of the present disclosure will be described in detail with reference to the accompanying drawings so that those skilled in the art may easily carry out the present disclosure. The present disclosure may be implemented in various different forms and is not limited to the embodiments described herein.

In order to clearly describe the present disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the present disclosure is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted. Further, expressions such as "at least one of A, B, or C" or "A, B, and/or C" should be interpreted as including any of "A," "B," "C," "AB," "AC," "BC," or "ABC."

Figure 2:
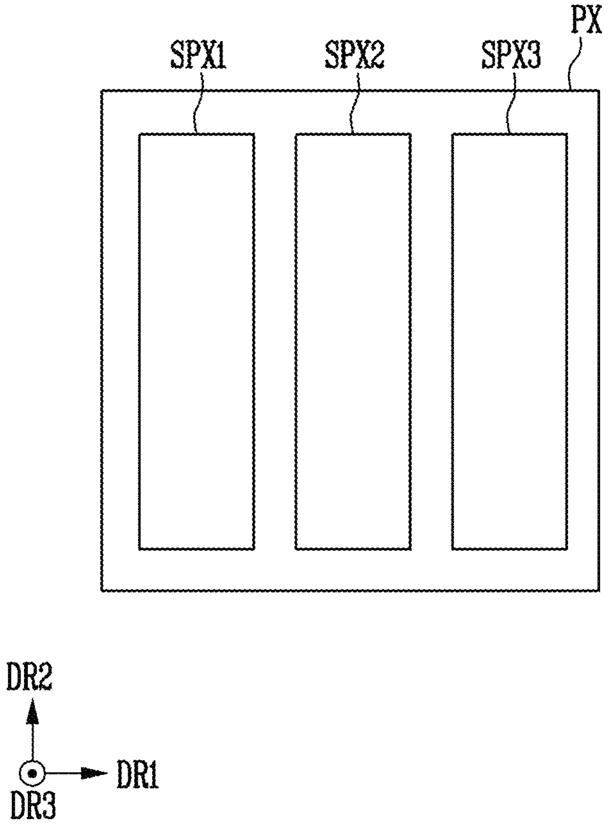
FIG. 2 is a diagram illustrating an example of a pixel of FIG. 1.
Figure 3:
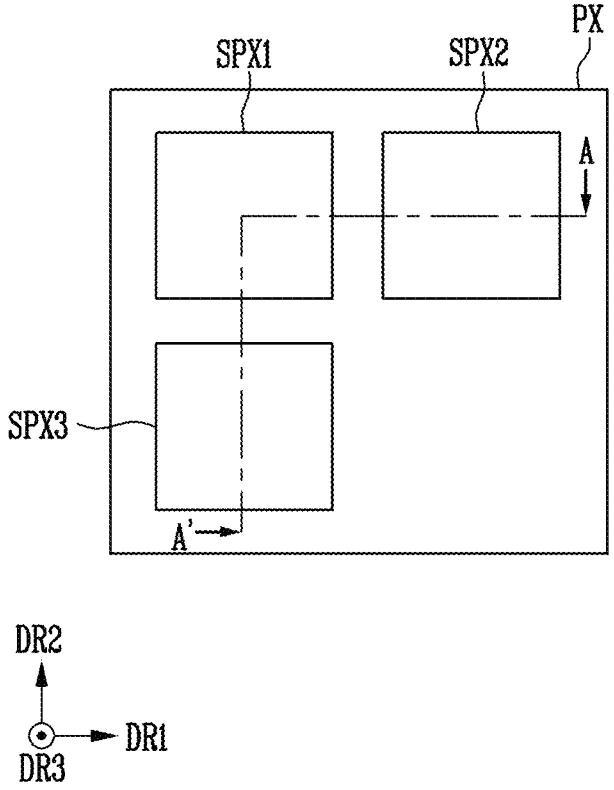
FIG. 3 is a diagram illustrating an example of the pixel of FIG. 1.

FIG. 1 is a plan view illustrating a display device according to one or more embodiments of the present disclosure. FIG. 2 is a diagram illustrating an example of a pixel of FIG. 1. FIG. 3 is a diagram illustrating an example of the pixel of FIG. 1.

Referring to FIG. 1, the display device 10 is a device for displaying a video or a still image. The display device 10 may be used as a display screen of various products such as not only a portable electronic device such as a mobile phone, a smart phone, a tablet personal computer (PC), a smart watch, a watch phone, a mobile communication terminal, an electronic notebook, an electronic book, a portable multimedia player (PMP), a navigation device, and an ultra mobile PC (UMPC), but also a television, a notebook computer, a monitor, a billboard, and/or Internet of things (IoT).

A display panel 100 may be formed in a plane of a rectangular shape having a long side of a first direction DR1 and a short side of a second direction DR2 intersecting the first direction DR1. A corner where the long side of the first direction DR1 and the short side of the second direction DR2 meet may be formed to be rounded to have a suitable curvature (e.g., a predetermined curvature) or may be formed in a right angle. A planar shape of the display panel 100 is not limited to a quadrangle, and may be formed in another polygon, circle, or ellipse. The display panel 100 may be formed to be flat, but is not limited thereto. For example, the display panel 100 may include a curved portion formed at left and right ends and having a constant curvature or a varying curvature. In addition, the display panel 100 may be flexibly formed to be crooked, curved, bent, folded, and/or rolled.

The display panel 100 may further include pixels PX, scan lines extending in the first direction DR1, and data lines extending in the second direction DR2 to display an image. The pixels PX may be arranged in a matrix shape in the first direction DR1 and the second direction DR2. For example, the pixels PX may be arranged along rows and columns of a matrix.

Each of the pixels PX may include a plurality of sub-pixels SPX1, SPX2, and SPX3 as shown in FIGS. 2 and 3. FIGS. 2 and 3 illustrate that each of the pixels PX includes three sub-pixels SPX1, SPX2, and SPX3, that is, a first sub-pixel SPX1, a second sub-pixel SPX2, and a third sub-pixel SPX3, but an embodiment of the present specification is not limited thereto.

The first sub-pixel SPX1, the second sub-pixel SPX2, and the third sub-pixel SPX3 may be connected to any one data line from among the data lines and at least one scan line from among the scan lines.

Each of the first sub-pixel SPX1, the second sub-pixel SPX2, and the third sub-pixel SPX3 may have a planar shape of a rectangle, a square, or a rhombus. For example, each of the first sub-pixel SPX1, the second sub-pixel SPX2, and the third sub-pixel SPX3 may have a planar shape of a rectangle having a short side of the first direction DR1 and a long side of the second direction DR2 as shown in FIG. 2. Alternatively, each of the first sub-pixel SPX1, the second sub-pixel SPX2, and the third sub-pixel SPX3 may have a planar shape of a square or a rhombus including sides having the same length in the first direction DR1 and the second direction DR2 as shown in FIG. 3.

As shown in FIG. 2, the first sub-pixel SPX1, the second sub-pixel SPX2, and the third sub-pixel SPX3 may be arranged along the first direction DR1. In one or more embodiments, either one of the second sub-pixel SPX2 or the third sub-pixel SPX3 and the first sub-pixel SPX1 may be arranged along the first direction DR1, and the other one of the second sub-pixel SPX2 or the third sub-pixel SPX3 and the first sub-pixel SPX1 may be arranged along the second direction DR2. For example, as shown in FIG. 3, the first sub-pixel SPX1 and the second sub-pixel SPX2 may be arranged along the first direction DR1, and the first sub-pixel SPX1 and the third sub-pixel SPX3 may be arranged along the second direction DR2.

Alternatively, either one of the first sub-pixel SPX1 or the third sub-pixel SPX3 and the second sub-pixel SPX2 may be arranged along the first direction DR1, and the other one of the first sub-pixel SPX1 or the third sub-pixel SPX3 and the second sub-pixel SPX2 may be arranged along the second direction DR2. Alternatively, either one of the first sub-pixel SPX1 or the second sub-pixel SPX2 and the third sub-pixel SPX3 may be arranged along the first direction DR1, and the other one of the first sub-pixel SPX1 or the second sub-pixel SPX2 and the third sub-pixel SPX3 may be arranged along the second direction DR2.

The first sub-pixel SPX1 may emit first light, the second sub-pixel SPX2 may emit second light, and the third sub-pixel SPX3 may emit third light. Here, the first light may be light of a red wavelength band, the second light may be light of a green wavelength band, and the third light may be light of a blue wavelength band. The red wavelength band may be a wavelength band of about 600 nm to 750 nm, the green wavelength band may be a wavelength band of about 480 nm to 560 nm, and the blue wavelength band may be a wavelength band of about 370 nm to 460 nm, but the present disclosure is not limited thereto.

Each of the first sub-pixel SPX1, the second sub-pixel SPX2, and the third sub-pixel SPX3 may include an inorganic light emitting element including an inorganic semiconductor as a light emitting element that emits light. For example, the inorganic light emitting element may be a flip chip type of micro light emitting diode (LED), but the present disclosure is not limited thereto.

As shown in FIGS. 2 and 3, the area of the first sub-pixel SPX1, the area of the second sub-pixel SPX2, and the area of the third sub-pixel SPX3 may be substantially the same. In one or more embodiments, at least one of the area of the first sub-pixel SPX1, the area of the second sub-pixel SPX2, or the area of the third sub-pixel SPX3 may be different from another area. In one or more embodiments, any two area selected from among the area of the first sub-pixel SPX1, the area of the second sub-pixel SPX2, and the area of the third sub-pixel SPX3 may be substantially the same and the remaining one area may be different from the two areas. In one or more embodiments, the area of the first sub-pixel SPX1, the area of the second sub-pixel SPX2, and the area of the third sub-pixel SPX3 may be different from each other.

Figure 4:
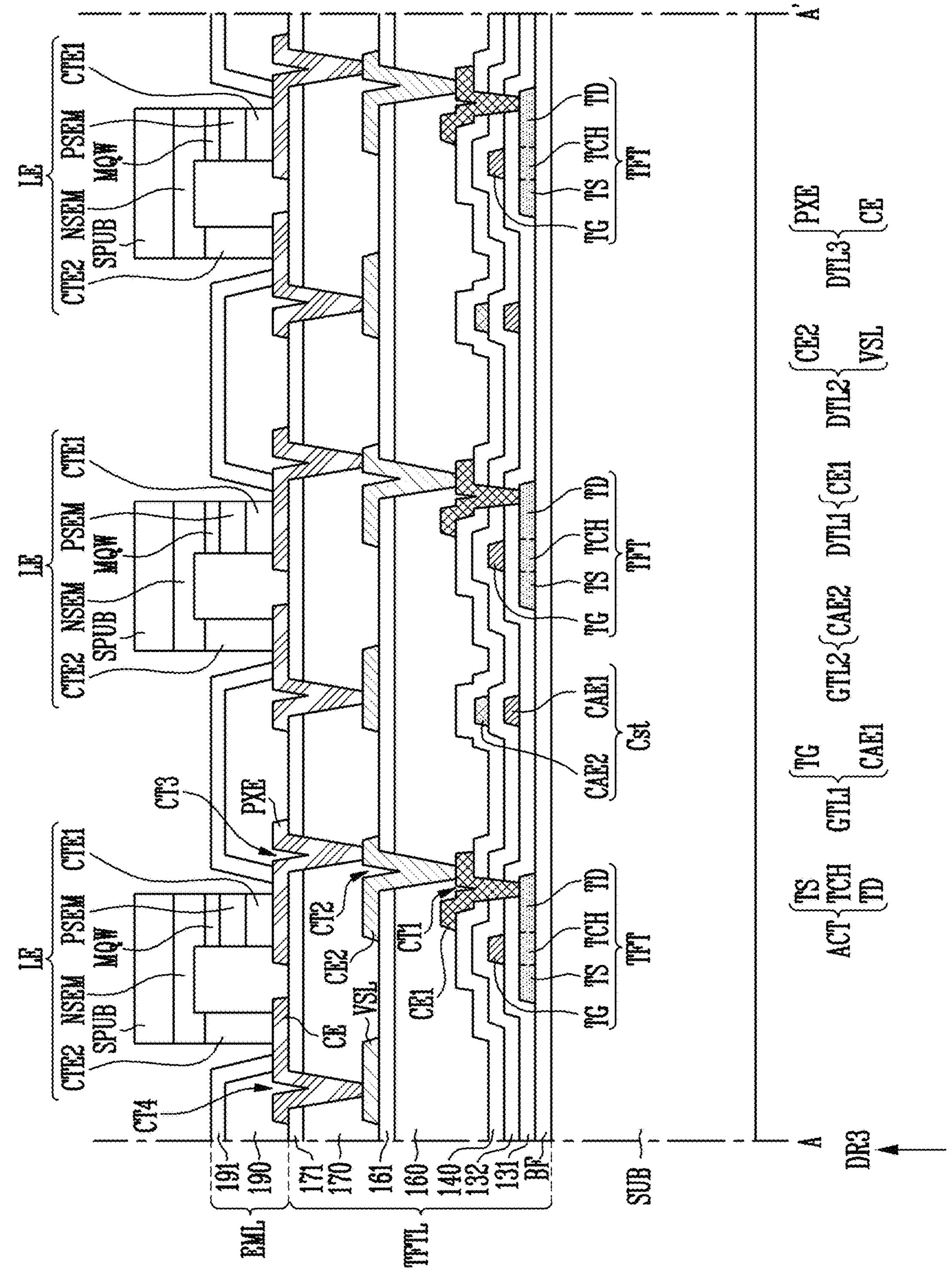
FIG. 4 is a cross-sectional view illustrating an example of the display device taken along the line A-A' of FIG. 3.

FIG. 4 is a cross-sectional view illustrating an example of the display device taken along a line A-A' of FIG. 3.

Referring to FIG. 4, a thin film transistor layer TFTL may be disposed on a substrate SUB. The thin film transistor layer TFTL may be a layer in which thin film transistors (TFTs) are formed.

The thin film transistor layer TFTL may include an active layer ACT, a first gate layer GTL1, a second gate layer GTL2, a first data metal layer DTL1, and a second data metal layer DTL2. In addition, the display panel 100 may include a buffer layer BF, a first gate insulating layer 131, a second gate insulating layer 132, an interlayer insulating layer 140, a first planarization layer 160, a first insulating layer 161, a second planarization layer 170, and a second insulating layer 171.

The substrate SUB may be a base substrate or a base member for supporting the display device 10. The substrate SUB may be a rigid substrate of an organic material. Alternatively, the substrate SUB may be a flexible substrate of which bending, folding, rolling, and/or the like is possible. In this case, the substrate SUB may include an insulating material such as a polymer resin such as polyimide (PI).

The buffer layer BF may be disposed on one surface (or a first surface) of the substrate SUB. The buffer layer BF may be a layer for preventing penetration of air or moisture. The buffer layer BF may be formed of a plurality of inorganic layers alternately stacked. For example, the buffer layer BF may be formed of a multilayer in which one or more inorganic layers selected from among a silicon nitride layer, a silicon oxynitride layer, a silicon oxide layer, a titanium oxide layer, and/or an aluminum oxide layer are alternately stacked. The buffer layer BF may be omitted.

An active layer ACT may be disposed on the buffer layer BF. The active layer ACT may include a silicon semiconductor such as polycrystalline silicon, single crystal silicon, low-temperature polycrystalline silicon, and/or amorphous silicon, and/or may include an oxide semiconductor.

The active layer ACT may include a channel TCH, a first electrode TS, and a second electrode TD of the thin film transistor TFT. The channel TCH of the thin film transistor TFT may be an area overlapping a gate electrode TG of the thin film transistor TFT in a third direction DR3 that is a thickness direction of the substrate SUB. The first electrode TS of the thin film transistor TFT may be disposed on one side of the channel TCH, and the second electrode TD may be disposed on another side of the channel TCH. The first electrode TS and the second electrode TD of the thin film transistor TFT may be areas that do not overlap the gate electrode TG in the third direction DR3. The first electrode TS and the second electrode TD of the thin film transistor TFT may be areas in which an ion is doped to a semiconductor (for example, a silicon semiconductor, an oxide semiconductor or the like) to have conductivity.

The first gate insulating layer 131 may be disposed on the active layer ACT and the buffer layer BF. The first gate insulating layer 131 may be formed of an inorganic layer, for example, a silicon nitride layer, a silicon oxynitride layer, a silicon oxide layer, a titanium oxide layer, or an aluminum oxide layer.

A first gate layer GTL1 may be disposed on the first gate insulating layer 131. The first gate layer GTL1 may include the gate electrode TG of the thin film transistor TFT and a first capacitor electrode CAE1. The first gate layer GTL1 may be formed as a single layer or multiple layers formed of one or more selected from among molybdenum (Mo), aluminum (Al), chromium (Cr), gold (Au), titanium (Ti), nickel (Ni), neodymium (Nd), and/or copper (Cu), and/or an alloy thereof.

The second gate insulating layer 132 may be disposed on the first gate layer GTL1 and the first gate insulating layer 131. The second gate insulating layer 132 may be formed of an inorganic layer, for example, a silicon nitride layer, a silicon oxynitride layer, a silicon oxide layer, a titanium oxide layer, and/or an aluminum oxide layer.

A second gate layer GTL2 may be disposed on the second gate insulating layer 132. The second gate layer GTL2 may include a second capacitor electrode CAE2. The second gate layer GTL2 may be formed as a single layer or multiple layers formed of one or more selected from among molybdenum (Mo), aluminum (Al), chromium (Cr), gold (Au), titanium (Ti), nickel (Ni), neodymium (Nd), and/or copper (Cu), and/or an alloy thereof.

The interlayer insulating layer 140 may be disposed on the second gate layer GTL2 and the second gate insulating layer 132. The interlayer insulating layer 140 may be formed of an inorganic layer, for example, a silicon nitride layer, a silicon oxynitride layer, a silicon oxide layer, a titanium oxide layer, and/or an aluminum oxide layer.

The first data metal layer DTL1 including a first connection electrode CE1 may be disposed on the interlayer insulating layer 140. The first data metal layer DTL1 may be formed as a single layer or multiple layers formed of one or more selected from among molybdenum (Mo), aluminum (Al), chromium (Cr), gold (Au), titanium (Ti), nickel (Ni), neodymium (Nd), and/or copper (Cu), and/or an alloy thereof.

The first connection electrode CE1 may be connected to the first electrode TS or the second electrode TD of the thin film transistor TFT through a first contact hole CT1 passing through the first gate insulating layer 131, the second gate insulating layer 132 and the interlayer insulating layer 140.

On the first data metal layer DTL1 and the interlayer insulating layer 140, the first planarization layer 160 for flattening a step difference due to the active layer ACT, the first gate layer GTL1, the second gate layer GTL2, and the first data metal layer DTL1 may be formed. The first planarization layer 160 may be formed of an organic layer such as acryl resin, epoxy resin, phenolic resin, polyamide resin, or polyimide resin.

The first insulating layer 161 may be disposed on the first planarization layer 160. The first insulating layer 161 may be formed of an inorganic layer, for example, a silicon nitride layer, a silicon oxynitride layer, a silicon oxide layer, a titanium oxide layer, and/or an aluminum oxide layer.

The second data metal layer DTL2 may be formed on the first insulating layer 161. The second data metal layer DTL2 may include a second connection electrode CE2 and a power line VSL. The second connection electrode CE2 may be connected to the first connection electrode CE1 through a second contact hole CT2 passing through the first insulating layer 161 and the first planarization layer 160. The second data metal layer DTL2 may be formed as a single layer or multiple layers formed of one or more selected from among molybdenum (Mo), aluminum (Al), chromium (Cr), gold (Au), titanium (Ti), nickel (Ni), neodymium (Nd), and/or copper (Cu), and/or an alloy thereof.

The second planarization layer 170 for flattening a step difference may be formed on the second data metal layer DTL2 and the first insulating layer 161. The second planarization layer 170 may be formed of an organic layer such as acryl resin, epoxy resin, phenolic resin, polyamide resin, and/or polyimide resin.

The second insulating layer 171 may be disposed on the second planarization layer 170. The second insulating layer 171 may be formed of an inorganic layer, for example, a silicon nitride layer, a silicon oxynitride layer, a silicon oxide layer, a titanium oxide layer, and/or an aluminum oxide layer.

A light emitting element layer EML may be disposed on the second insulating layer 171. The light emitting element layer EML may include pixel electrodes PXE, common electrodes CE, and light emitting elements LE. A third data metal layer DTL3 may include the pixel electrodes PXE and the common electrodes CE. Each of the first sub-pixel SPX1, the second sub-pixel SPX2, and the third sub-pixel SPX3 includes the light emitting element LE connected to the pixel electrode PXE and the common electrode CE. The pixel electrode PXE may be defined as an anode electrode, and the common electrode CE may be defined as a cathode electrode.

The pixel electrodes PXE and the common electrodes CE may be disposed on the second insulating layer 171. Each of the pixel electrodes PXE may be connected to the second connection electrode CE2 through a third contact hole CT3 passing through the second insulating layer 171 and the second planarization layer 170. Accordingly, each of the pixel electrodes PXE may be connected to the first electrode TS or the second electrode TD of the thin film transistor TFT via the first connection electrode CE1 and the second connection electrode CE2. Therefore, a pixel voltage or an anode voltage controlled by the thin film transistor TFT may be applied to the pixel electrode PXE.

Each of the common electrodes CE may be connected to the power line VSL through a fourth contact hole CT4 passing through the second insulating layer 171 and the second planarization layer 170. Accordingly, a power voltage of the power line VSL may be applied to each of the common electrodes CE.

The pixel electrodes PXE and the common electrodes CE may include a metal material having a high reflectance such as a stack structure of aluminum and titanium (Ti/Al/Ti), a stack structure of aluminum and ITO (ITO/Al/ITO), an APC alloy, and/or a stack structure of an APC alloy and ITO (ITO/APC/ITO). The APC alloy is an alloy of silver (Ag), palladium (Pd), and copper (Cu).

FIG. 4 illustrates that each of the light emitting elements LE is the flip chip type of micro LED in which the first contact electrode CTE1 and the second contact electrode CTE2 are disposed to face the pixel electrode PXE and the common electrode CE. The light emitting element LE may be formed of an inorganic material such as GaN. In the light emitting element LE, each of a length in the first direction DR1, a length in the second direction DR2, and a length in the third direction DR3 may be several to several hundred μm. For example, in the light emitting element LE, each of the length in the first direction DR1, the length in the second direction DR2, and the length in the third direction DR3 may be about 100 μm or less.

The light emitting elements LE may be grown on a semiconductor substrate such as a silicon wafer to be formed. Each of the light emitting elements LE may be transferred onto the pixel electrode PXE and the common electrode CE of the substrate SUB from the silicon wafer. In one or more embodiments, each of the light emitting elements LE may be transferred onto the pixel electrode PXE and the common electrode CE of the substrate SUB through an electrostatic method using an electrostatic head or a stamp method using an elastic polymer material such as PDMS or silicon as a transfer substrate.

Each of the light emitting elements LE may be a light emitting structure including a base substrate SPUB, an n-type semiconductor NSEM, an active layer MQW, a p-type semiconductor PSEM, a first contact electrode CTE1, and a second contact electrode CTE2. The base substrate SPUB may be a sapphire substrate, but the present disclosure is not limited thereto.

The n-type semiconductor NSEM may be disposed on one surface of the base substrate SPUB. For example, the n-type semiconductor NSEM may be disposed on a lower surface of the base substrate SPUB. The n-type semiconductor NSEM may be formed of GaN doped with an n-type conductive dopant such as Si, Ge, or Sn.

The active layer MQW may be disposed on a portion of one surface of the n-type semiconductor NSEM. The active layer MQW may include a material of a single or multiple quantum well structure. When the active layer MQW includes the material of the multiple quantum well structure, the active layer MQW may have a structure in which a plurality of well layers and barrier layers are alternately stacked. At this time, the well layer may be formed of InGaN, and the barrier layer may be formed of GaN and/or AlGaN, but are not limited thereto. In addition, the active layer MQW may have a structure in which a semiconductor material having a large band gap energy and a semiconductor material having a small band gap energy are alternately stacked, and may include Group III to Group V semiconductor materials different according to a wavelength band of emitted light.

The p-type semiconductor PSEM may be disposed on one surface of the active layer MQW. The p-type semiconductor PSEM may be formed of GaN doped with a p-type conductive dopant such as Mg, Zn, Ca, Se, and/or Ba.

The first contact electrode CTE1 may be disposed on the p-type semiconductor PSEM, and the second contact electrode CTE2 may be disposed on another portion of one surface of the n-type semiconductor NSEM. The other portion of the one surface of the n-type semiconductor NSEM on which the second contact electrode CTE2 is disposed may be disposed to be spaced from the portion of the n-type semiconductor NSEM on which the active layer MQW is disposed.

The first contact electrode CTE1 and the pixel electrode PXE may be adhered to each other through a conductive adhesive member such as an anisotropic conductive film (ACF) or an anisotropic conductive paste (ACP). Alternatively, the first contact electrode CTE1 and the pixel electrode PXE may be adhered to each other through a soldering process.

In one or more embodiments, the second contact electrode CTE2 and the common electrode CE may be adhered to each other through a conductive adhesive member such as an anisotropic conductive film (ACF) or an anisotropic conductive paste (ACP). Alternatively, the second contact electrode CTE2 and the common electrode CE may be adhered to each other through a soldering process.

In one or more embodiments, a bank 190 covering an edge of the pixel electrode PXE and an edge of the common electrode CE may be disposed on the second insulating layer 171. The bank 190 may be formed an organic layer such as an acryl resin, an epoxy resin, a phenolic resin, a polyamide resin, and/or a polyimide resin.

A bank insulating layer 191 may be disposed on the bank 190. The bank insulating layer 191 may cover the edge of the pixel electrode PXE and the edge of the common electrode CE. The bank insulating layer 191 may be formed of an inorganic layer, for example, a silicon nitride layer, a silicon oxynitride layer, a silicon oxide layer, a titanium oxide layer, and/or an aluminum oxide layer.

Figure 5:
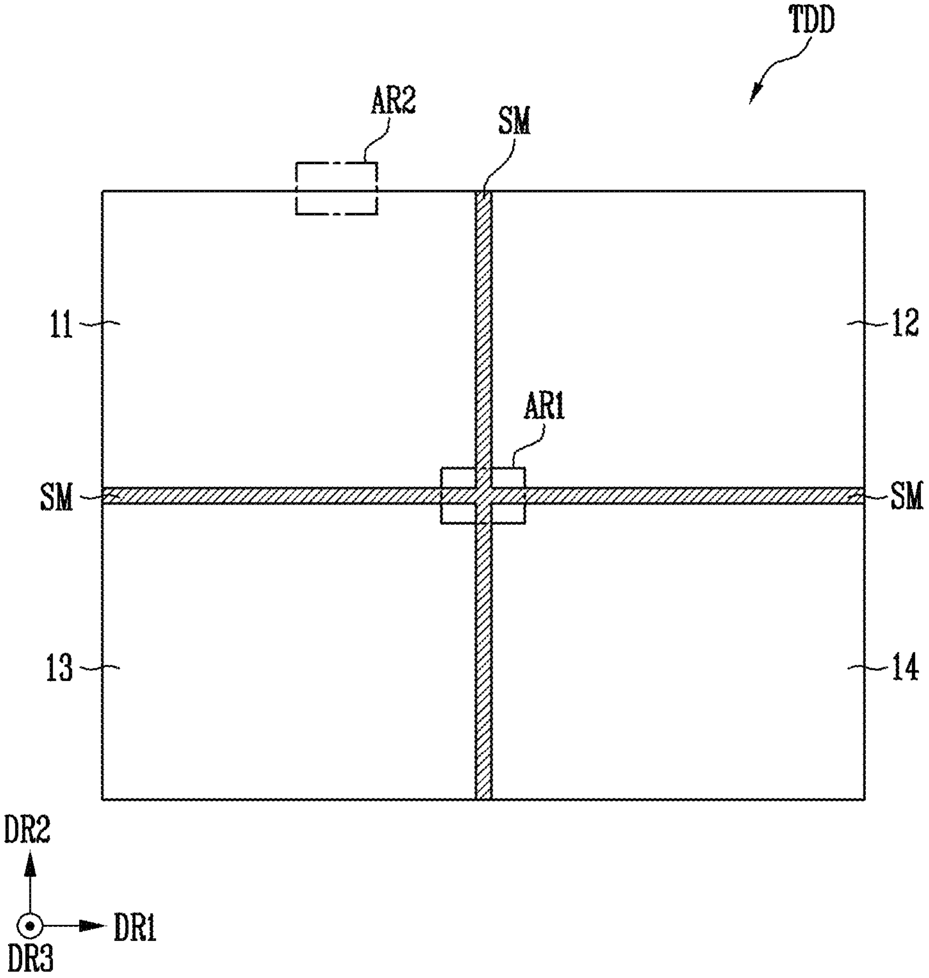
FIG. 5 is a diagram illustrating a tiled display device including a plurality of display devices according to one or more embodiments.

FIG. 5 is a diagram illustrating a tiled display device including a plurality of display devices according to one or more embodiments.

Referring to FIG. 5, the tiled display device TDD may include a plurality of display devices 11, 12, 13, and 14, and a seam SM. For example, the tiled display device TDD may include a first display device 11, a second display device 12, a third display device 13, and a fourth display device 14.

The plurality of display devices 11, 12, 13, and 14 may be arranged in a grid shape. The plurality of display devices 11, 12, 13, and 14 may be arranged in a matrix form in a plurality of rows and a plurality of columns. For example, the first display device 11 and the second display device 12 may be adjacent to each other in the first direction DR1. The first display device 11 and the third display device 13 may be adjacent to each other in the second direction DR2. The third display device 13 and the fourth display device 14 may be adjacent to each other in the first direction DR1. The second display device 12 and the fourth display device 14 may be adjacent to each other in the second direction DR2.

However, the number and disposition of the plurality of display devices 11, 12, 13, and 14 in the tiled display device TDD are not limited to those shown in FIG. 5. The number and disposition of the display devices 11, 12, 13, and 14 in the tiled display device TDD may be determined according to a size of each of the display device 10 and the tiled display device TDD and a shape of the tiled display device TDD.

The plurality of display devices 11, 12, 13, and 14 may have the same size, but are not limited thereto. For example, the plurality of display devices 11, 12, 13, and 14 may have different sizes.

Each of the plurality of display devices 11, 12, 13, and 14 may have a rectangular shape including a long side and a short side. The plurality of display devices 11, 12, 13, and 14 may be disposed in a state in which the long sides or the short sides are connected to each other. Some or all of the plurality of display devices 11, 12, 13, and 14 may be disposed at an edge of the tiled display device TDD and may form one side of the tiled display device TDD. At least one display device selected from among the plurality of display devices 11, 12, 13, and 14 may be disposed at at least one corner of the tiled display device TDD, and may form two adjacent sides of the tiled display device TDD. At least one display device selected from among the plurality of display devices 11, 12, 13, and 14 may be surrounded by other display devices.

Each of the plurality of display devices 11, 12, 13, and 14 may be substantially the same as the display device 10 described with reference to FIGS. 1 to 4. Therefore, a description of each of the plurality of display devices 11, 12, 13, and 14 is omitted.

The seam SM may include a coupling member or an adhesive member. In this case, the plurality of display devices 11, 12, 13, and 14 may be connected to each other through the coupling member or the adhesive member of the seam SM. The seam SM may be disposed between the first display device 11 and the second display device 12, between the first display device 11 and the third display device 13, between the second display device 12 and the fourth display device 14, and between the third display device 13 and the fourth display device 14.

Figure 6:
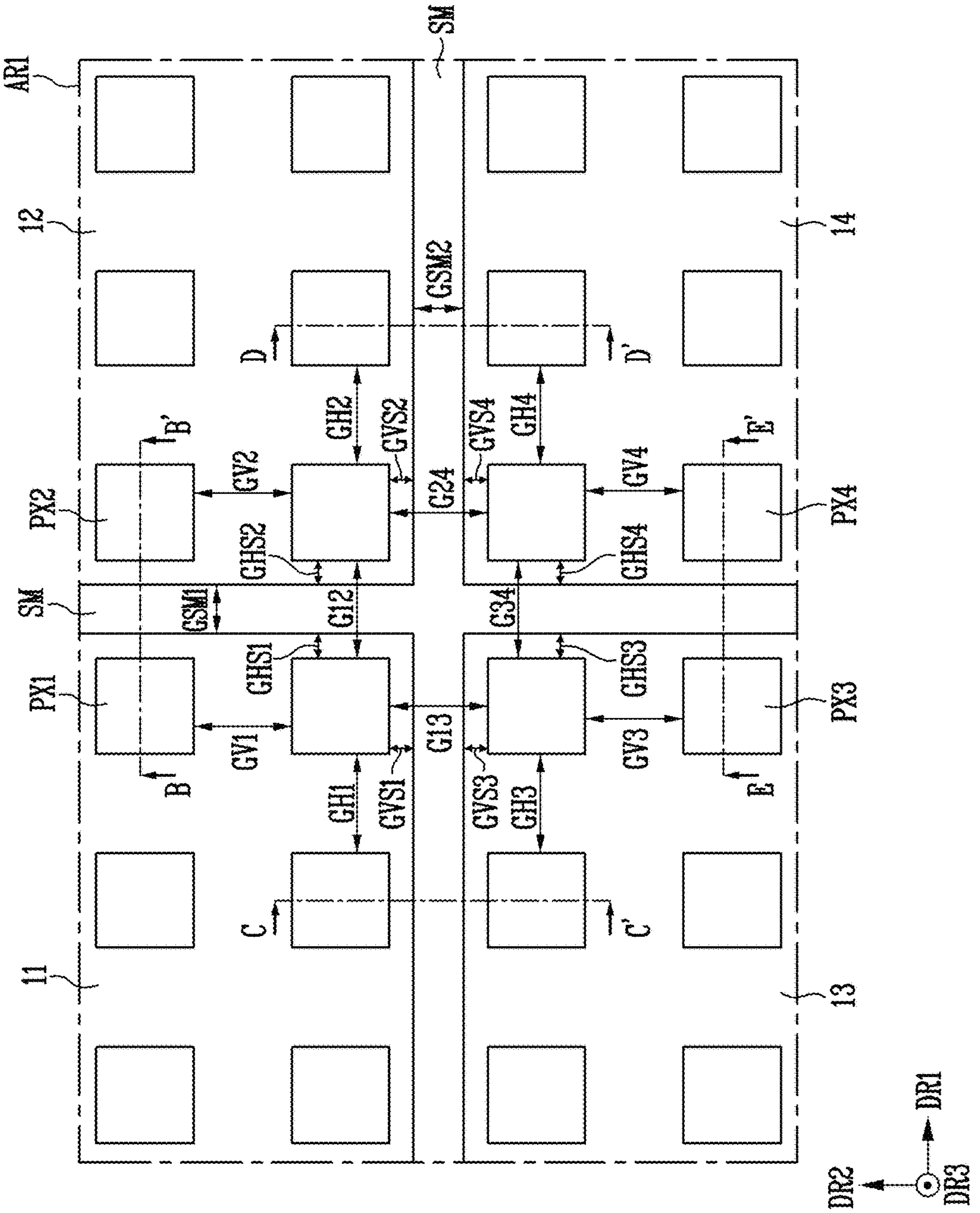
FIG. 6 is an enlarged layout diagram illustrating an area AR1 of FIG. 5 in detail.

FIG. 6 is an enlarged layout diagram illustrating an area AR1 of FIG. 5 in detail.

Referring to FIG. 6, the seam SM may have a planar shape of a crisscross, a cross, or a plus sign in a center area of the tiled display device TDD in which the first display device 11, the second display device 12, the third display device 13, and the fourth display device 14 are adjacent to each other. The seam SM may be disposed between the first display device 11 and the second display device 12, between the first display device 11 and the third display device 13, between the second display device 12 and the fourth display device 14, and between the third display device 13 and the fourth display device 14.

The first display device 11 may include first pixels PX1 arranged in a matrix form along the first direction DR1 and the second direction DR2 to display an image. The second display device 12 may include second pixels PX2 arranged in a matrix form along the first direction DR1 and the second direction DR2 to display an image. The third display device 13 may include third pixels PX3 arranged in a matrix form along the first direction DR1 and the second direction DR2 to display an image. The fourth display device 14 may include fourth pixels PX4 arranged in a matrix form a the first direction DR1 and the second direction DR2 to display an image.

A minimum distance between the first pixels PX1 adjacent in the first direction DR1 may be defined as a first horizontal separation distance GH1, and a minimum distance between the second pixels PX2 adjacent in the first direction DR1 may be defined as a second horizontal separation distance GH2. The first horizontal separation distance GH1 and the second horizontal separation distance GH2 may be substantially the same.

The seam SM may be disposed between the first pixel PX1 and the second pixel PX2 adjacent in the first direction DR1. A minimum distance G12 between the first pixel PX1 and the second pixel PX2 adjacent in the first direction DR1 may be a sum of a minimum distance GHS1 between the first pixel PX1 and the seam SM in the first direction DR1, a minimum distance GHS2 between the second pixel PX2 and the seam SM in the first direction DR1, and a width GSM1 of the seam SM in the first direction DR1.

The minimum distance G12 between the first pixel PX1 and the second pixel PX2 adjacent in the first direction DR1, the first horizontal separation distance GH1, and the second horizontal separation distance GH2 may be substantially the same. To this end, the minimum distance GHS1 between the first pixel PX1 and the seam SM in the first direction DR1 may be less than the first horizontal separation distance GH1, and the minimum distance GHS2 between the second pixel PX2 and the seam SM in the first direction DR1 may be less than the second horizontal separation distance GH2. In addition, the width GSM1 of the seam SM in the first direction DR1 may be less than the first horizontal separation distance GH1 and the second horizontal separation distance GH2.

A minimum distance between the third pixels PX3 adjacent in the first direction DR1 may be defined as a third horizontal separation distance GH3, and a minimum distance between the fourth pixels PX4 adjacent in the first direction DR1 may be defined as a fourth horizontal separation distance GH4. The third horizontal separation distance GH3 and the fourth horizontal separation distance GH4 may be substantially the same.

The seam SM may be disposed between the third pixel PX3 and the fourth pixel PX4 adjacent in the first direction DR1. A minimum distance G34 between the third pixel PX3 and the fourth pixel PX4 adjacent in the first direction DR1 may be a sum of a minimum distance GHS3 between the third pixel PX3 and the seam SM in the first direction DR1, a minimum distance GHS4 between the fourth pixel PX4 and the seam SM in the first direction DR1, and the width GSM1 of the seam SM in the first direction DR1.

The minimum distance G34 between the third pixel PX3 and the fourth pixel PX4 adjacent in the first direction DR1, the third horizontal separation distance GH3, and the fourth horizontal separation distance GH4 may be substantially the same. To this end, the minimum distance GHS3 between the third pixel PX3 and the seam SM in the first direction DR1 may be less than the third horizontal separation distance GH3 and the minimum distance GHS4 between the fourth pixel PX4 and the seam SM in the first direction DR1 may be less than the fourth horizontal separation distance GH4. In addition, the width GSM1 of the seam SM in the first direction DR1 may be less than the third horizontal separation distance GH3 or the fourth horizontal separation distance GH4.

A minimum distance between the first pixels PX1 adjacent in the second direction DR2 may be defined as a first vertical separation distance GV1, and a minimum distance between the third pixels PX3 in the second direction DR2 may be defined as a third vertical separation distance GV3. The first vertical separation distance GV1 and the third vertical separation distance GV3 may be substantially the same.

The seam SM may be disposed between the first pixel PX1 and the third pixel PX3 adjacent in the second direction DR2. A minimum distance G13 between the first pixel PX1 and the third pixel PX3 adjacent in the second direction DR2 may be a sum of a minimum distance GVS1 between the first pixel PX1 and the seam SM in the second direction DR2, a minimum distance GVS3 between the third pixel PX3 and the seam SM in the second direction DR2, and a width GSM2 of the seam SM in the second direction DR2.

The minimum distance G13 between the first pixel PX1 and the third pixel PX3 adjacent in the second direction DR2, the first vertical separation distance GV1, and the third vertical separation distance GV3 may be substantially the same. To this end, the minimum distance GVS1 between the first pixel PX1 and the seam SM in the second direction DR2 may be less than the first vertical separation distance GV1, and the minimum distance GVS3 between the third pixel PX3 and the seam SM in the second direction DR2 may be less than the third vertical separation distance GV3. In addition, the width GSM2 of the seam SM in the second direction DR2 may be less than the first vertical separation distance GV1 or the third vertical separation distance GV3.

A minimum distance between the second pixels PX2 adjacent in the second direction DR2 may be defined as a second vertical separation distance GV2, and a minimum distance between the fourth pixels PX4 adjacent in the second direction DR2 may be defined as a fourth vertical separation distance GV4. The second vertical separation distance GV2 and the fourth vertical separation distance GV4 may be substantially the same.

The seam SM may be disposed between the second pixel PX2 and the fourth pixel PX4 adjacent in the second direction DR2. A minimum distance G24 between the second pixel PX2 and the fourth pixel PX4 adjacent in the second direction DR2 may be a sum of a minimum distance GVS2 between the second pixel PX2 and the seam SM in the second direction DR2, a minimum distance GVS4 between the fourth pixel PX4 and the seam SM in the second direction DR2, and the width GSM2 of the seam SM in the second direction DR2.

The minimum distance G24 between the second pixel PX2 and the fourth pixel PX4 adjacent in the second direction DR2, the second vertical separation distance GV2, and the fourth vertical separation distance GV4 may be substantially the same. To this end, the minimum distance GVS2 between the second pixel PX2 and the seam SM in the second direction DR2 may be less than the second vertical separation distance GV2, and the minimum distance GVS4 between the fourth pixel PX4 and the seam SM in the second direction DR2 may be less than the fourth vertical separation distance GV4. In addition, the width GSM2 of the seam SM in the second direction DR2 may be less than the second vertical separation distance GV2 or the fourth vertical separation distance GV4.

As shown in FIG. 6, the minimum distance between the pixels of the display devices adjacent to each other may be substantially the same as the minimum distance between the pixels of each of the display devices so that the seam SM is not visually recognized between images displayed by the plurality of display devices 11, 12, 13, and 14.

Figure 7:
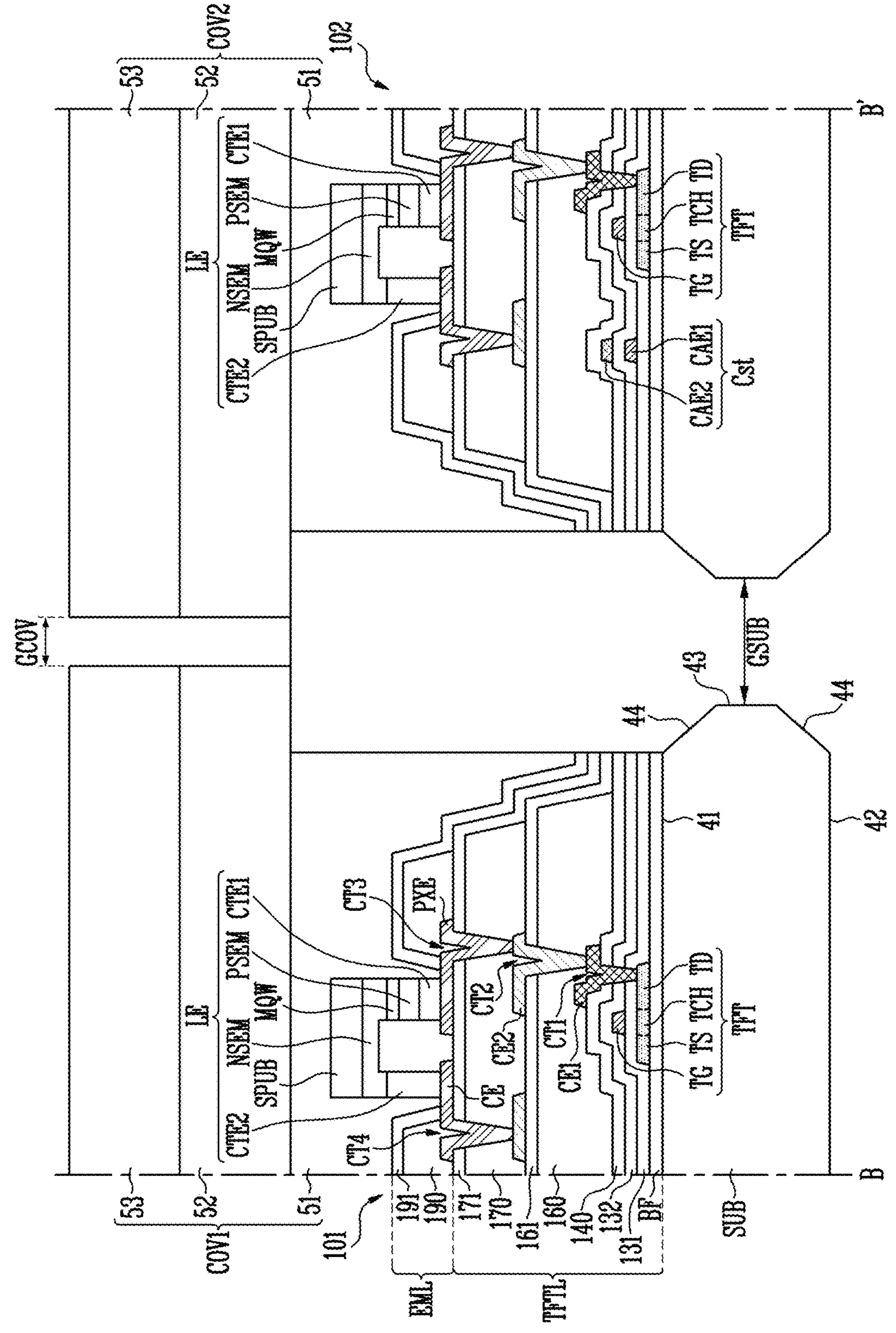
FIG. 7 is a cross-sectional view illustrating an embodiment of the tiled display device taken along the line B-B' of FIG. 6.

FIG. 7 is a cross-sectional view illustrating an embodiment of the tiled display device taken along the line B-B' of FIG. 6.

Referring to FIG. 7, the first display device 11 includes a first display panel 101 and a first front cover COV1. The second display device 12 includes a second display panel 102 and a second front cover COV2.

Each of the first display panel 101 and the second display panel 102 includes the substrate SUB, the thin film transistor layer TFTL, and the light emitting element layer EML. Because the thin film transistor layer TFTL and the light emitting element layer EML are described with reference to FIG. 4, an overlapping description is omitted.

The substrate SUB may include a first surface 41 on which the thin film transistor layer TFTL is disposed, a second surface 42, which is a surface opposite to the first surface 41, and a first side surface 43 disposed between the first surface 41 and the second surface 42. The first surface 41 may be a front surface or an upper surface of the substrate SUB, and the second surface 42 may be a back surface or a lower surface of the substrate SUB.

In addition, the substrate SUB may further include a chamfer surface 44 disposed between the first surface 41 and the first side surface 43 and between the second surface 42 and the first side surface 43. The thin film transistor layer TFTL and the light emitting element layer EML may not be disposed on the chamfer surface 44. The substrate SUB of the first display device 11 and the substrate SUB of the second display device 12 may be prevented from being collided with each other and damaged, by the chamfer surface 44.

The chamfer surface 44 may also be disposed between the first surface 41 and each of other side surfaces except for the first side surface 43 and between the second surface 42 and each of other side surfaces except the first side surface 43. For example, when the first display device 11 and the second display device 12 have the planar shape of the rectangle as shown in FIG. 5, the chamfer surface 44 may be disposed between the first surface 41 and each of a second side surface, a third side surface, and a fourth side surface, and between the second surface 42 and each of the second side surface, the third side surface, and the fourth side surface.

The first front cover COV1 may be disposed on the chamfer surface 44 of the substrate SUB. That is, the first front cover COV1 may protrude more than the substrate SUB in the first direction DR1 and the second direction DR2. Therefore, a distance GSUB between the substrate SUB of the first display device 11 and the substrate SUB of the second display device 12 may be greater than a distance GCOV between the first front cover COV1 and the second front cover COV2.

Each of the first front cover COV1 and the second front cover COV2 may include an adhesive member 51, a light transmittance control layer 52 disposed on the adhesive member 51, and an anti-glare layer 53 disposed on the light transmittance control layer 52.

The adhesive member 51 of the first front cover COV1 serves to attach the light emitting element layer EML and the first front cover COV1 of the first display panel 101. The adhesive member 51 of the second front cover COV2 serves to attach the light emitting element layer EML and the second front cover COV2 of the second display panel 102. The adhesive member 51 may be a transparent adhesive member capable of transmitting light. For example, the adhesive member 51 may be an optically clear adhesive film or an optically clear resin.

The anti-glare layer 53 may be designed to diffusely reflect external light to prevent visual recognition of an image from being degraded due to reflection of the external light as it is. Accordingly, a contrast ratio of the image displayed by the first display device 11 and the second display device 12 may be increased by the anti-glare layer 53.

The light transmittance control layer 52 may be designed to reduce a transmittance of external light or light reflected from the first display panel 101 and the second display panel 102. Accordingly, a distance GSUB between the substrate SUB of the first display panel 101 and the substrate SUB of the second display panel 102 may be prevented from being visually recognized from the outside.

The anti-glare layer 53 may be implemented with a polarizing plate, and the light transmittance control layer 52 may be implemented with a phase retarder layer, but the present specification is not limited thereto.

Because an example of the tiled display device taken along the lines C-C', D-D', and E-E' of FIG. 6 is substantially the same as an example of the tiled display device taken along the line B-B' described with refer to FIG. 7, a description thereof is omitted.

Figure 8:
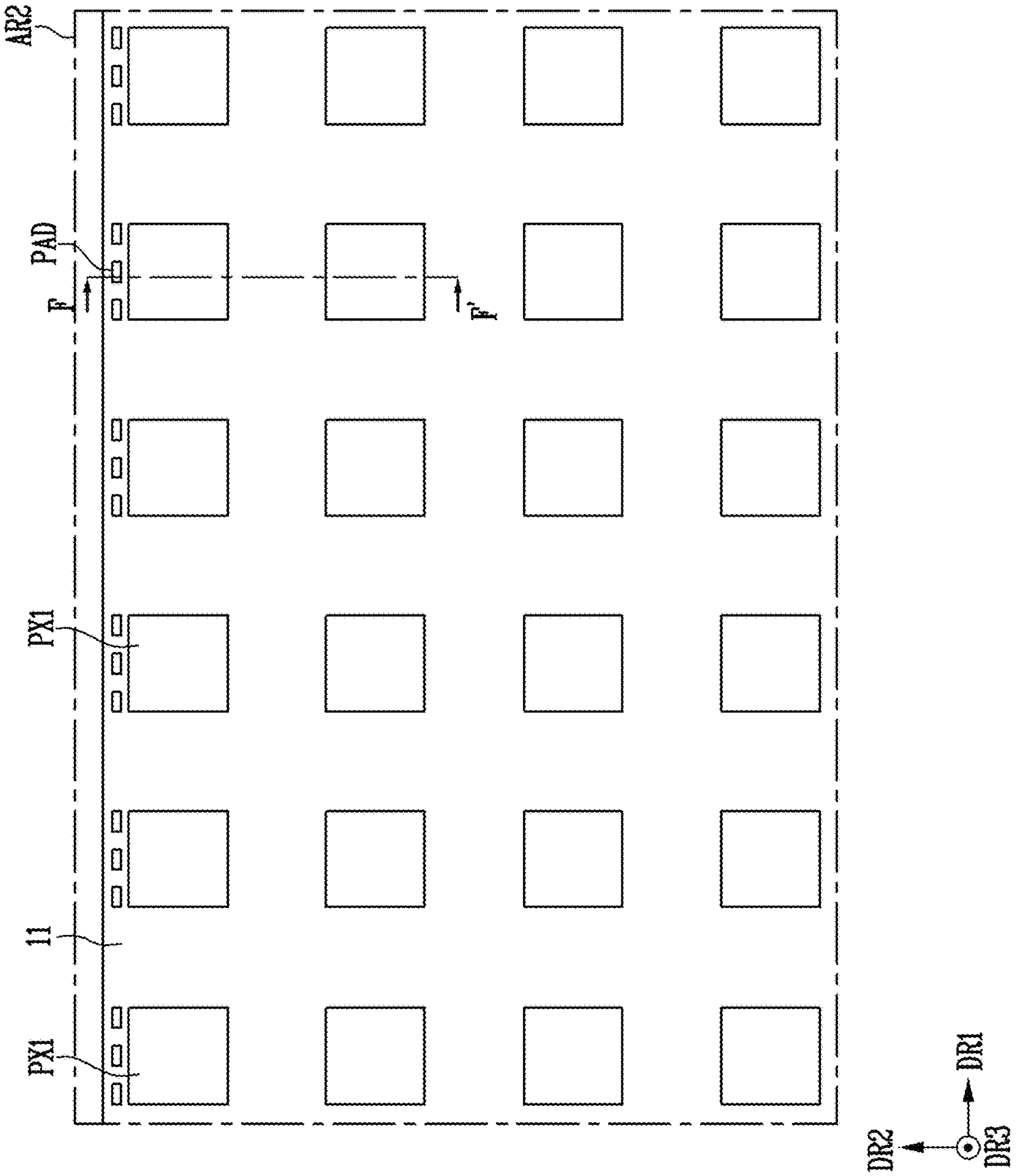
FIG. 8 is an enlarged layout diagram illustrating an area AR2 of FIG. 5 in detail.

FIG. 8 is an enlarged layout diagram illustrating an area AR2 of FIG. 5 in detail. In FIG. 8, pads PAD and the first pixels PX1 disposed on an upper side of the first display device 11 are shown.

Referring to FIG. 8, the pads PAD may be disposed on an upper edge of the first display device 11. When data lines of the first display device 11 extend in the second direction DR2, the pads PAD may be disposed on the upper edge and a lower edge of the first display device 11. In one or more embodiments, when the data lines of the first display device 11 extend in the first direction DR1, the pads PAD may be disposed on a left edge and a right edge of the first display device 11.

Each of the pads PAD may be connected to the data line. In addition, each of the pads PAD may be connected to a side surface line SCL (refer to FIG. 9). The side surface line SCL may be disposed on one side surface and the lower surface (or the back surface) of the substrate SUB. The side surface line SCL may be connected to a connection line CCL on the lower surface of the substrate SUB (refer to FIG. 9).

Figure 9:
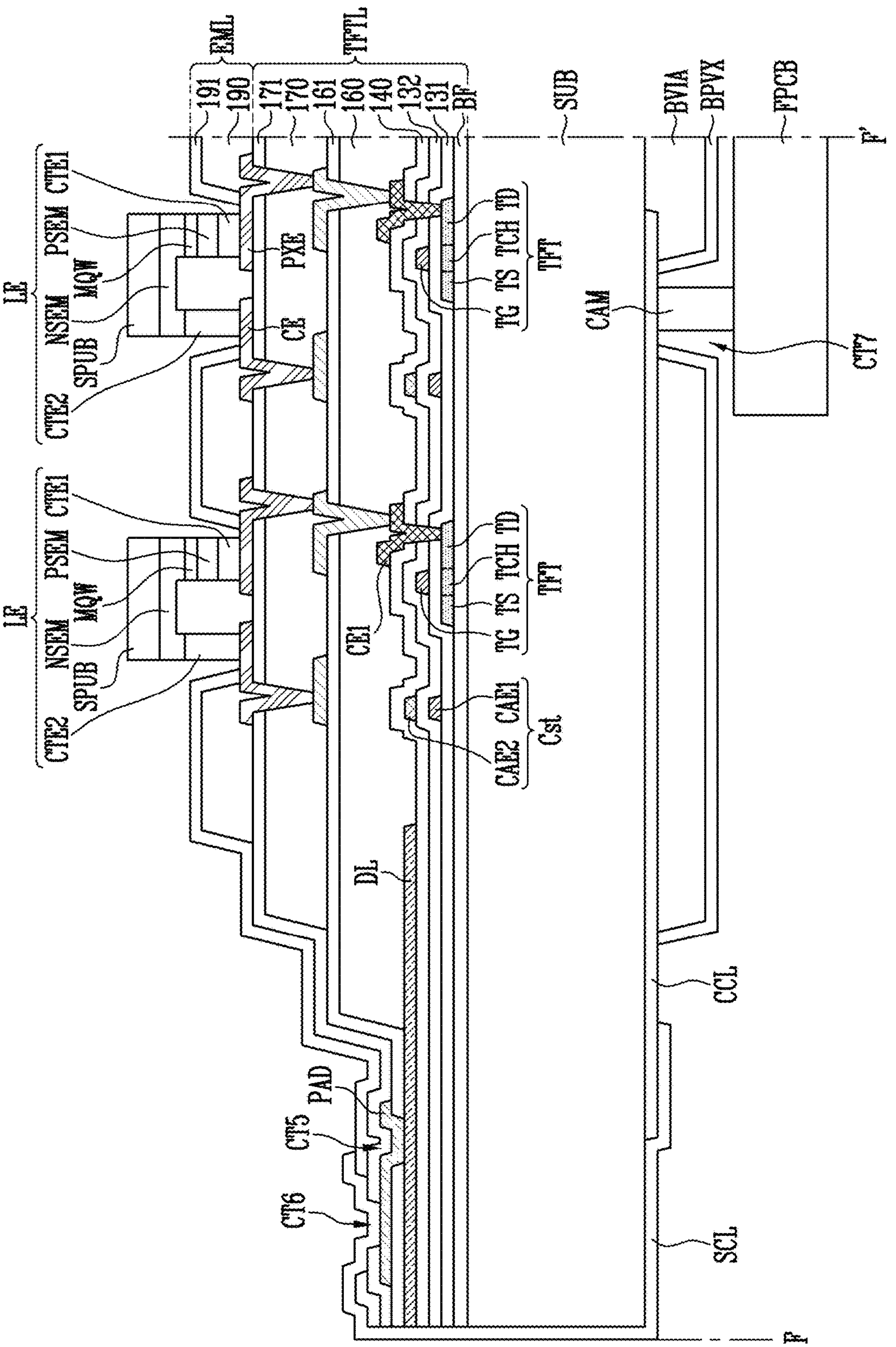
FIG. 9 is a cross-sectional view illustrating an embodiment of the tiled display device taken along the line F-F' of FIG. 8.

FIG. 9 is a cross-sectional view illustrating an embodiment of the tiled display device taken along the line F-F' of FIG. 8. In FIG. 9, the same reference numerals are assigned to the same components as those of the cross-sectional view shown in FIG. 4, and a description overlapping the description of FIG. 4 is omitted.

Referring to FIG. 9, the pad PAD may be disposed on the first insulating layer 161. The pad PAD may not be covered by the bank insulating layer 191 and may be exposed. The pad PAD may include the same material as the pixel electrodes PXE and the common electrodes CE. For example, the pad PAD may include a metal material having a high reflectance such as a stack structure of aluminum and titanium (Ti/Al/Ti), a stack structure of aluminum and ITO (ITO/Al/ITO), an APC alloy, and/or a stack structure of an APC alloy and ITO (ITO/APC/ITO).

The first data metal layer DTL1 may include a data line DL. The data line DL may be disposed on the interlayer insulating layer 140. That is, the data line DL may be disposed on the same layer as the first connection electrode CE1 and may include the same material as the first connection electrode CE1.

The pad PAD may be connected to the data line DL through a fifth contact hole CT5 passing through the first insulating layer 161.

The connection line CCL may be disposed on the back surface of the substrate SUB. The connecting line CCL may be a single layer or multiple layers formed of one or more selected from among molybdenum (Mo), aluminum (Al), chromium (Cr), gold (Au), titanium (Ti), nickel (Ni), neodymium (Nd), and/or copper (Cu), or an alloy thereof.

A back surface planarization layer BVIA may be disposed on a portion of the connection line CCL. The back surface planarization layer BVIA may be formed of an organic layer such as an acryl resin, an epoxy resin, a phenolic resin, a polyamide resin, and/or a polyimide resin.

A back surface insulating layer BPVX may be disposed on the back surface planarization layer BVIA. The back surface insulating layer BPVX may be formed of an inorganic layer, for example, a silicon nitride layer, a silicon oxynitride layer, a silicon oxide layer, a titanium oxide layer, and/or an aluminum oxide layer.

The side surface line SCL may be disposed on a lower surface edge, a side surface, and an upper surface edge of the substrate SUB. One end of the side surface line SCL may be connected to the connection line CCL. One end of the side surface line SCL may contact a side surface and a lower surface of the connection line CCL. Another end of the side surface line SCL may be connected to the pad portion PAD. The other end of the side surface line SCL may be connected to the pad portion PAD through a sixth contact hole CT6 passing the bank insulating layer 191 and the second insulating layer 171.

The side surface line SCL may be disposed on a side surface of the substrate SUB, a side surface of the buffer layer BF, a side surface of the first gate insulating layer 131, a side surface of the second gate insulating layer 132, a side surface of the interlayer insulating layer 140, a side surface of the first insulating layer 161, a side surface of the second insulating layer 171 and a side surface of the bank insulating layer 191.

A flexible film FPCB may be disposed on a lower surface of the back surface insulating layer BPVX. The flexible film FPCB may be connected to the connection line CCL through a seventh contact hole CT7 passing through the back surface planarization layer BVIA and the back surface insulating layer BPVX using a conductive adhesive member CAM. A source driving circuit for supplying a data signal (or a data voltage) to the data lines DL may be disposed on a lower surface of the flexible film FPCB. The source driving circuit may include a first data driver 1004 and a second data driver 1006 shown in FIG. 11. The conductive adhesive member CAM may be an anisotropic conductive film or an anisotropic conductive paste.

As shown in FIGS. 8 and 9, the source driving circuit of the flexible film FPCB disposed under the substrate SUB may be connected to the data lines DL through the connection line CCL, the side surface line SCL, and the pad PAD. That is, because the source driving circuit is positioned under the substrate SUB, a non-display area may be eliminated, and thus the pixels PX may also be formed at the edge of the substrate SUB.

Figure 10:
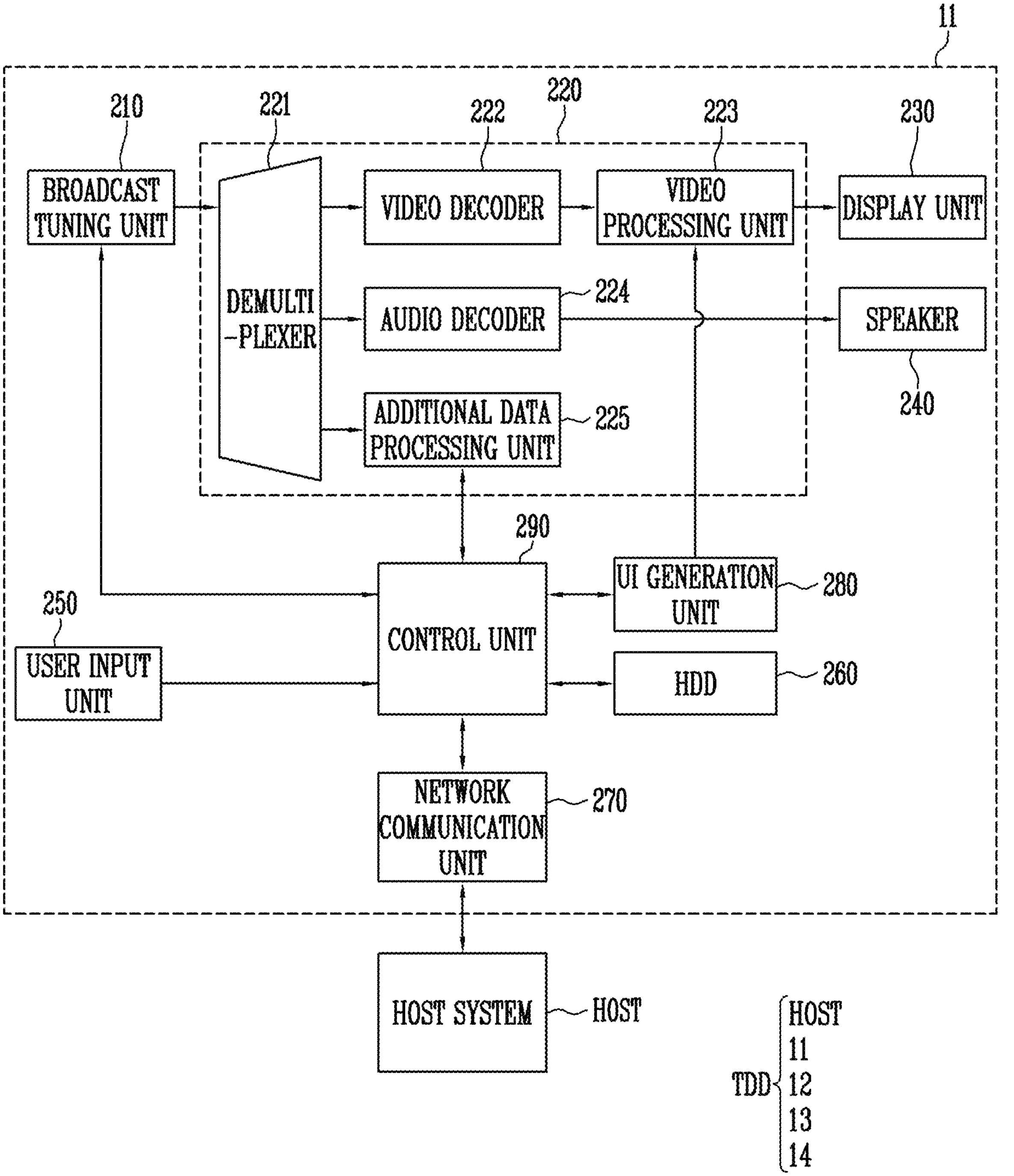
FIG. 10 is a block diagram illustrating a tiled display device according to one or more embodiments.

FIG. 10 is a block diagram illustrating a tiled display device according to one or more embodiments. In FIG. 10, the first display device 11 and a host system HOST are shown for convenience of description.

Referring to FIG. 10, the tiled display device TDD according to one or more embodiments may include the host system HOST and the plurality of display devices 11, 12, 13, and 14.

The host system HOST may be implemented as any one of a television system, a home theater system, a set-top box, a navigation system, a DVD player, a Blu-ray player, a personal computer (PC), a mobile phone system, and/or a tablet.

The host system HOST may receive a user's command in various methods. For example, the host system HOST may receive a command by a user's touch. For example, the host system HOST may receive the user's command from a keyboard or a remote controller. The host system HOST may divide the original video data by the number of display devices. For example, the host system HOST may divide the original video data into first video data corresponding to a first image, second video data corresponding to a second image, third video data corresponding to a third image, and fourth video data corresponding to a fourth image, in response to the first display device 11, the second display device 12, the third display device 13, and the fourth display device 14. The host system HOST may transmit the first video data to the first display device 11, transmit the second video data to the second display device 12, transmit the third video data to the third display device 13, and transmit the fourth video data to the fourth display device 14.

The first display device 11 may display the first image according to the first video data, the second display device 12 may display the second image according to the second video data, the third display device 13 may display the third image according to the third video data, and the fourth display device 14 may display the fourth image according to the fourth video data. Accordingly, the user may view the original image in which the first to fourth images displayed on the first to fourth display devices 11, 12, 13 and 14 are combined.

In one or more embodiments, the first display device 11 may include a broadcast tuning unit 210, a signal processing unit 220, a display unit 230, a speaker 240, a user input unit 250, a hard disk drive (HDD) 260 (or a solid state drive (SSD)), a network communication unit 270, a UI generation unit 280, and/or a control unit 290.

The broadcast tuning unit 210 may tune a desired channel frequency (e.g., a predetermined channel frequency) under control of the control unit 290 and receive a broadcast signal of a corresponding channel through an antenna. The broadcast tuning unit 210 may include a channel detection module and an RF demodulation module.

A broadcast signal demodulated by the broadcast tuning unit 210 is processed by the signal processing unit 220 and output to the display unit 230 and the speaker 240. Here, the signal processing unit 220 may include a demultiplexer 221, a video decoder 222, a video processing unit 223, an audio decoder 224, and an additional data processing unit 225.

The demultiplexer 221 divides the demodulated broadcast signal into a video signal, an audio signal, and/or additional data. The divided video signal, audio signal, and/or additional data are restored by the video decoder 222, the audio decoder 224, and/or the additional data processing unit 225, respectively. At this time, the video decoder 222, the audio decoder 224, and the additional data processing unit 225 restore as a decoding format corresponding to an encoding format when the broadcast signal is transmitted.

A decoded video signal is converted by the video processing unit 223 to fit a vertical frequency, resolution, a screen ratio, and the like corresponding to an output standard of the display unit 230, and a decoded audio signal is output to the speaker 240.

The display unit 230 may include a display panel 100 on which an image is displayed, and a panel driver for controlling driving of the display panel 100. A detailed block diagram of the display panel 100 and the panel driver will be described later with reference to FIG. 11.

The user input unit 250 may receive a signal transmitted from the host system HOST. The user input unit 250 may be provided to receive a command related to communication with another display device from the user as well as data related to selection of a channel transmitted by the host system HOST, and selection and manipulation of a user interface (UI) menu.

The HDD 260 stores various software programs including an operating system (OS) program, a recorded broadcast program, a moving picture, a photo, and other data, and may be formed of a storage medium such as a hard disk or a nonvolatile memory.

The network communication unit 270 is for short-range communication with the host system HOST and the other display devices, and may be implemented with a communication module including an antenna pattern that may implement mobile communication, data communication, Bluetooth, RF, Ethernet, and the like.

The network communication unit 270 may transmit and receive a wireless signal with at least one of a base station, an external terminal, or a server on a mobile communication network built according to technical standards or a communication method (for example, global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), 5G, or the like) for mobile communication.

The network communication unit 270 may transmit and receive a wireless signal in a communication network according to wireless Internet technologies. The wireless Internet technologies may include, for example, wireless LAN (WLAN), wireless-fidelity (Wi-Fi), wireless fidelity (Wi-Fi) direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and/or the like, and the antenna pattern transmits and receives data according to at least one wireless Internet technology within a range including an Internet technology that is not listed above.

The UI generation unit 280 generates a user input (UI) menu for communication with the host system HOST and the other display devices, and may be implemented by an algorithm code and an OSD IC. The UI menu for communication with the host system HOST and the other display devices 12 to 14 may be a menu for designating a counterpart digital TV for communication and selecting a desired function.

The control unit 290 is in charge of overall control of the first display device 11 and is in charge of communication control of the host system HOST and the second to fourth display devices 12, 13, and 14, and a corresponding algorithm code for control is stored, and the control unit 290 may be implemented by a micro controller unit (MCU) in which the stored algorithm code is executed.

The control unit 290 controls to transmit a corresponding control instruction and data to the host system HOST and the second to fourth display devices 12, 13, and 14 through the network communication unit 270 according to an input and selection of the user input unit 250. Of course, when a suitable control instruction (e.g., a predetermined control instruction) and data are input from the host system HOST and the second to fourth display devices 12, 13, and 14, an operation is performed according to the corresponding control instruction.

Because a block diagram of the second display device 12, a block diagram of the third display device 13, and a block diagram of the fourth display device 14 are substantially the same as the block diagram of the first display device 11 described with reference to FIG. 10, a description thereof is omitted.

Figure 11:
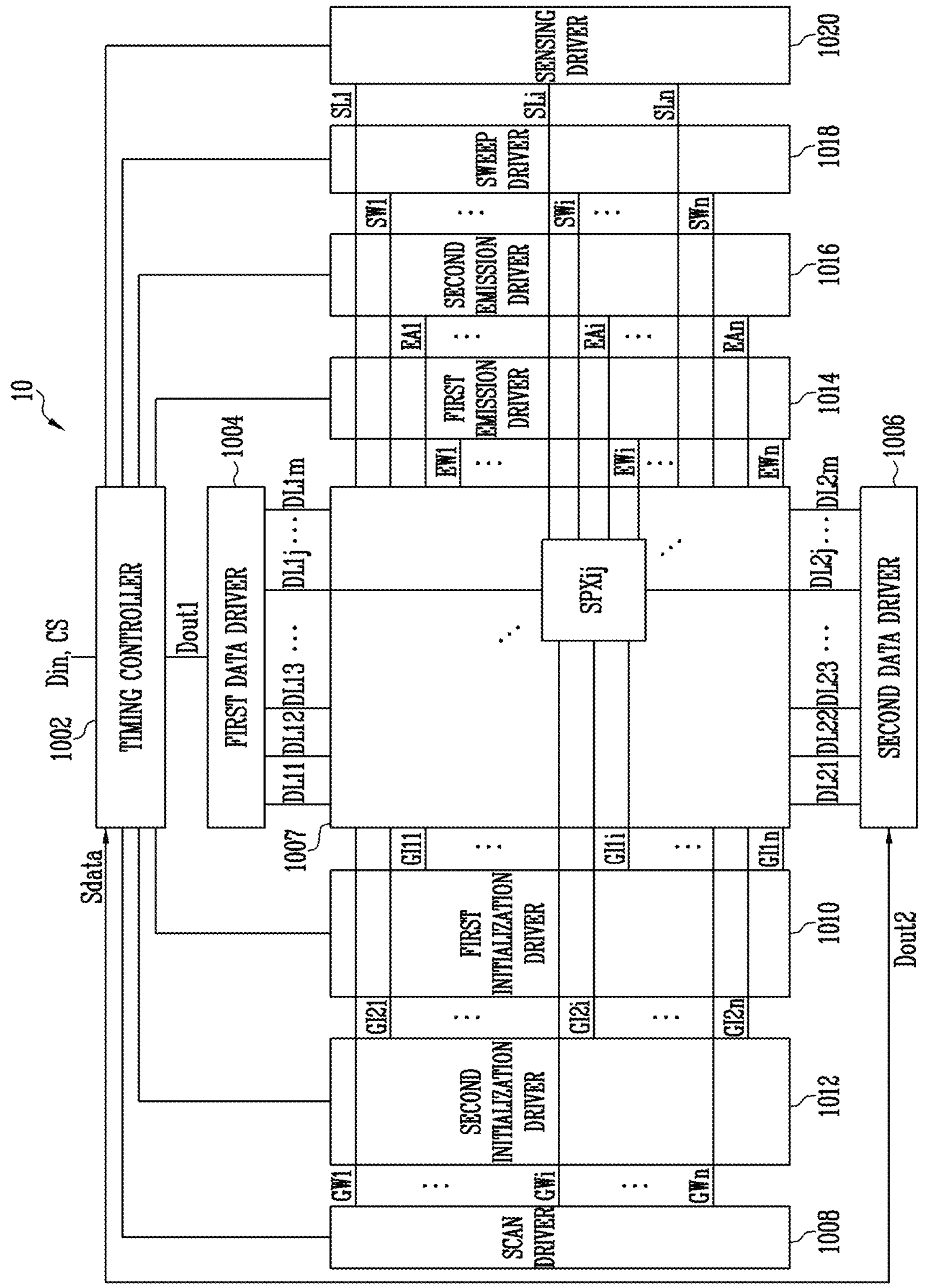
FIG. 11 is a block diagram illustrating a display device according to one or more embodiments of the present disclosure.

FIG. 11 is a block diagram illustrating a display device according to one or more embodiments of the present disclosure.

Referring to FIG. 11, the display device 10 may include a timing controller 1002, a first data driver 1004, a second data driver 1006, a pixel unit 1007, a scan driver 1008, a first initialization driver 1010, a second initialization driver 1012, a first emission driver 1014, a second emission driver 1016, a sweep driver 1018, and a sensing driver 1020.

The above-described display panel 100 may correspond to the pixel unit 1007. In addition, the above-described panel driver may correspond to the timing controller 1002, the first data driver 1004, the second data driver 1006, the scan driver 1008, the first initialization driver 1010, the second initialization driver 1012, the first emission driver 1014, the second emission driver 1016, the sweep driver 1018, and the sensing driver 1020. Each of the timing controller 1002, the first data driver 1004, the second data driver 1006, the scan driver 1008, the first initialization driver 1010, the second initialization driver 1012, the first emission driver 1014, the second emission driver 1016, the sweep driver 1018, and the sensing driver 1020 may be configured as one integrated circuit (IC), or two or more configurations 1002, 1004, 1006, 1008, 1010, 1012, 1014, 1016, 1018, and 1020 may be configured as one IC. In one or more embodiments, at least a portion of the panel driver may be formed on the substrate SUB without being configured as a chip.

The timing controller 1002 may receive input data Din and control signals CS from a processor. The processor may be an application processor, a central processing unit (CPU), a graphics processing unit (GPU), and/or the like of the display device 10. The processor may be the signal processing unit 220 shown in FIG. 10. The input data Din may include first input data corresponding to a first color, second input data corresponding to a second color, and third input data corresponding to a third color.

The timing controller 1002 may generate first output data Dout1 by correcting the input data Din according to a structure (e.g., an RGB stripe structure, a PENTILE® structure, and/or the like). The PENTILE® pixel arrangement structure may be referred to as an RGBG matrix structure (e.g., a PENTILE® matrix structure or an RGBG structure (e.g., a PENTILE® structure)). PENTILE® is a registered trademark of Samsung Display Co., Ltd., Republic of Korea) and a characteristic (threshold voltage of driving transistor, mobility, deterioration degree of light emitting element, or the like) of the pixel unit 1007. In addition, the timing controller 1002 may generate driving signals for controlling the drivers 1004, 1006, 1008, 1010, 1012, 1014, 1016, 1018, and 1020 in response to the control signal CS, and supply the driving signals to the drivers 1004, 1006, 1008, 1010, 1012, 1014, 1016, 1018, and 1020. For example, the timing controller 1002 may supply driving signals including a clock signal, a start signal, and the like to the scan driver 1008, the first initialization driver 1010, the second initialization driver 1012, the first emission driver 1014, the second emission driver 1016, the sweep driver 1018, and the sensing driver 1020, respectively.

The timing controller 1002 receives sensing data Sdata from the second data driver 1006. The sensing data Sdata may include characteristic information of circuit elements positioned in a current path for supplying a current to the light emitting element in each of sub-pixels SPX. The timing controller 1002 supplies second output data Dout2 to the second data driver 1006. Here, the second output data Dout2 may be set so that a second driving transistor included in each of the sub-pixels SPX supplies a constant current to the light emitting element. The timing controller 1002 may generate the second output data Dout2 using the sensing data Sdata so that a characteristic of circuit elements included in each of the sub-pixels SPX may be compensated, and supply the second output data Dout2 to the second data driver 1006. For example, the timing controller 1002 may generate the second output data Dout2 so that a second data signal corresponding to different voltages is supplied to at least two sub-pixels from among sub-pixels of the same color. Here, the second data signal corresponding to the different voltages may be set so that light of substantially the same luminance is generated from a light emitting element included in each of the two sub-pixels.

The second data driver 1006 may generate the second data signal (or a second data voltage) corresponding to the second output data Dout2 and supply the second data signal (or the second data voltage) to the sub-pixels SPX. The second data signal may be set so that a constant current flows in the second driving transistor included in each of the sub-pixels SPX. In this case, a second data signal of different voltages may be supplied to each of the first sub-pixel SPX1, the second sub-pixel SPX2, and the third sub-pixel SPX3 described above. For example, the second data signal of the different voltages may be supplied to each of the first sub-pixel SPX1, the second sub-pixel SPX2, and the third sub-pixel SPX3 in consideration of a capacitance of a light emitting element of each pixel, a threshold voltage, an emission delay time, and the like.

To this end, first global data corresponding to the first sub-pixels SPX1, second global data corresponding to the second sub-pixels SPX2, and third global data corresponding to the third sub-pixels SPX3 may be stored in advance. In one or more embodiments, the timing controller 1002 may correct the first global data, the second global data, and the third global data using the sensing data Sdata to generate the second output data Dout2 to be supplied to each sub-pixel SPX.

In one or more embodiments, the timing controller 1002 may receive the sensing data Sdata corresponding to each of the first sub-pixels SPX1, and generate the second output data Dout2 to be supplied to the first sub-pixels SPX1 by correcting the first global data so that a characteristic of each of the first sub-pixels SPX1 is compensated in response to the sensing data Sdata.

In one or more embodiments, the timing controller 1002 may receive the sensing data Sdata corresponding to each of the second sub-pixels SPX2, and generate the second output data Dout2 to be supplied to the second sub-pixels SPX2 by correcting the second global data so that a characteristic of each of the second sub-pixels SPX2 is compensated in response to the sensing data Sdata.

In one or more embodiments, the timing controller 1002 may receive the sensing data Sdata corresponding to each of the third sub-pixels SPX3, and generate the second output data Dout2 to be supplied to the third sub-pixels SPX3 by correcting the third global data so that a characteristic of each of the third sub-pixels SPX3 is compensated in response to the sensing data Sdata.

The first data driver 1004 may supply a first data signal (or a first data voltage) to first data lines DL11, DL12, DL13, . . . , DL1*j*, . . . , and DL1*m* using the first output data Dout1 and the driving signal received from the timing controller 1002. For example, the first data driver 1004 may sample the first output data Dout1 using the clock signal, and supply the first data signal corresponding to a grayscale (e.g., a gray level) of the first output data Dout1 to the first data lines DL11 to DL1*m* in a pixel row unit. In this case, "m" may be an integer greater than 0.

The second data driver 1006 may supply a second data signal to second data lines DL21, DL22, DL23, . . . , DL2*j*, . . . , and DL2*m* using the second output data Dout2 and the driving signal received from the timing controller 1002. For example, the second data driver 1006 may sample the second output data Dout2 using the clock signal, and supply the second data signal corresponding to the second output data Dout2 to the second data lines DL21 to DL2*m* in a pixel row unit.

The scan driver 1008 may generate a scan signal to be supplied to scan lines GW1, . . . , GWi, . . . , and GWn by receiving the clock signal, the start signal, and the like from the timing controller 1002. For example, the scan driver 1008 may sequentially supply the scan signal having a turn-on level of pulse to the scan lines GW1 to GWn. For example, the scan driver 1008 may be configured of a shift register, and generate the scan signal in a method of sequentially transferring the start signal, which is a turn-on level of pulse, to a next stage circuit under control of the clock signal. In this case, "n" may be an integer greater than 0.

The first initialization driver 1010 may generate a first initialization signal to be supplied to first initialization lines GI11, . . . , GI1*i*, . . . , and GI1*n* by receiving the clock signal, the start signal, and the like from the timing controller 1002. For example, the first initialization driver 1010 may sequentially supply the first initialization signal having a turn-on level of pulse to the first initialization lines GI11 to GI1*n*. For example, the first initialization driver 1010 may be configured of a shift register, and may generate the first initialization signal in a method of sequentially transferring the start signal, which is a turn-on level of pulse, to a next stage circuit under the control of the clock signal.

The second initialization driver 1012 may generate a second initialization signal to be supplied to second initialization lines GI21, . . . , GI2*i*, . . . , and GI2*n* by receiving the clock signal, the start signal, and the like from the timing controller 1002. For example, the second initialization driver 1012 may sequentially supply the second initialization signal having a turn-on level of pulse to the second initialization lines GI21 to GI2*n*. For example, the second initialization driver 1012 may be configured of a shift register, and generate the second initialization signal in a method of sequentially transferring the start signal, which is a turn-on level of pulse, to a next stage circuit under the control of the clock signal.

The first emission driver 1014 may generate a first emission control signal to be supplied to first emission control lines EW1, . . . , EWi, . . . , and EWn by receiving the clock signal, the start signal, and the like from the timing controller 1002. For example, the first emission driver 1014 may sequentially supply the first emission control signal having a turn-on level of pulse to the first emission control lines EW1 to EWn. For example, the first emission driver 1014 may be configured of a shift register, and generate the first emission control signal in a method of sequentially transferring the start signal, which is a turn-on level of pulse, to a next stage circuit under the control of the clock signal.

The second emission driver 1016 may generate a second emission control signal to be supplied to second emission control lines EA1, . . . , EAi, . . . , and EAn by receiving the clock signal, the start signal, and the like from the timing controller 1002. For example, the second emission driver 1016 may sequentially supply the second emission control signal having a turn-on level of pulse to the second emission control lines EA1 to EAn. For example, the second emission driver 1016 may be configured of a shift register, and generate the second emission control signal in a method of sequentially transferring the start signal, which is a turn-on level of pulse, to a next stage circuit under the control of the clock signal.

The sweep driver 1018 may generate a sweep signal to be supplied to sweep lines SW1, . . . , SWi, . . . , and SWn by receiving the clock signal, the start signal, and the like from the timing controller 1002. For example, the sweep driver 1018 may sequentially supply the sweep signals to the sweep lines SW1 to SWn. For example, the sweep signals may be gradually decreased voltage signals. For example, the sweep driver 1018 may be configured in a form of a shift register, and generate the sweep signals in a method of sequentially transferring a carry signal to a next stage circuit under the control of the clock signal.

The sensing driver 1020 may generate a sensing signal to be supplied to sensing lines SL1, . . . , SLi, . . . , and SLn in response to the driving signal received from the timing controller 1002. For example, the sensing driver 1020 may supply the sensing signal having a turn-on level of pulse to the sensing lines SL1 to SLn during a sensing period in which a characteristic of the sub-pixels SPX is sensed. For example, the sensing driver 1020 does not supply the sensing signal to the sensing lines SL1 to SLn during a normal period in which an image is displayed in the pixel unit 1007.

In one or more embodiments, the sensing driver 1020 may sequentially supply the sensing signal to the sensing lines SL1 to SLn during the sensing period. In this case, the sensing driver 1020 may be configured of a shift register. In one or more embodiments, the sensing driver 1020 may randomly supply the sensing signal to the sensing lines SL1 to SLn during the sensing period. In this case, the sensing driver 1020 may be configured of a decoder or the like.

The pixel unit 1007 includes the pixels. As described above, the pixel may include the first sub-pixel SPX1, the second sub-pixel SPX2, and the third sub-pixel SPX3. For example, a sub-pixel SPXij may be connected to corresponding first data line DL1*j*, second data line DL2*j*, scan line GWi, first initialization line GI1*i*, second initialization line GI2*i*, first emission control line EWi, second emission control line EAi, sweep line SWi, and sensing line SLi. In this case, "i" and "j" may be integers greater than 0.

Each of the first sub-pixels SPX1 may include a first light emitting element of a first color. Each of the second sub-pixels SPX2 may include a second light emitting element of a second color. Each of the third sub-pixels SPX3 may include a third light emitting element of a third color. The first color, second color, and third color may be different colors. For example, the first color may be one color from among red, green, and blue, the second color may be one color other than the first color from among red, green, and blue, and the third color may be the remaining color other than the first color and the second color from among red, green, or blue. In addition, magenta, cyan, and yellow may be used as the first to third colors instead of red, green, and blue.

The sub-pixels of the pixel unit 1007 may be disposed in various forms such as diamond PENTILE®, RGB-Stripe, S-stripe, Real RGB, and normal PENTILE®.

Figure 12:
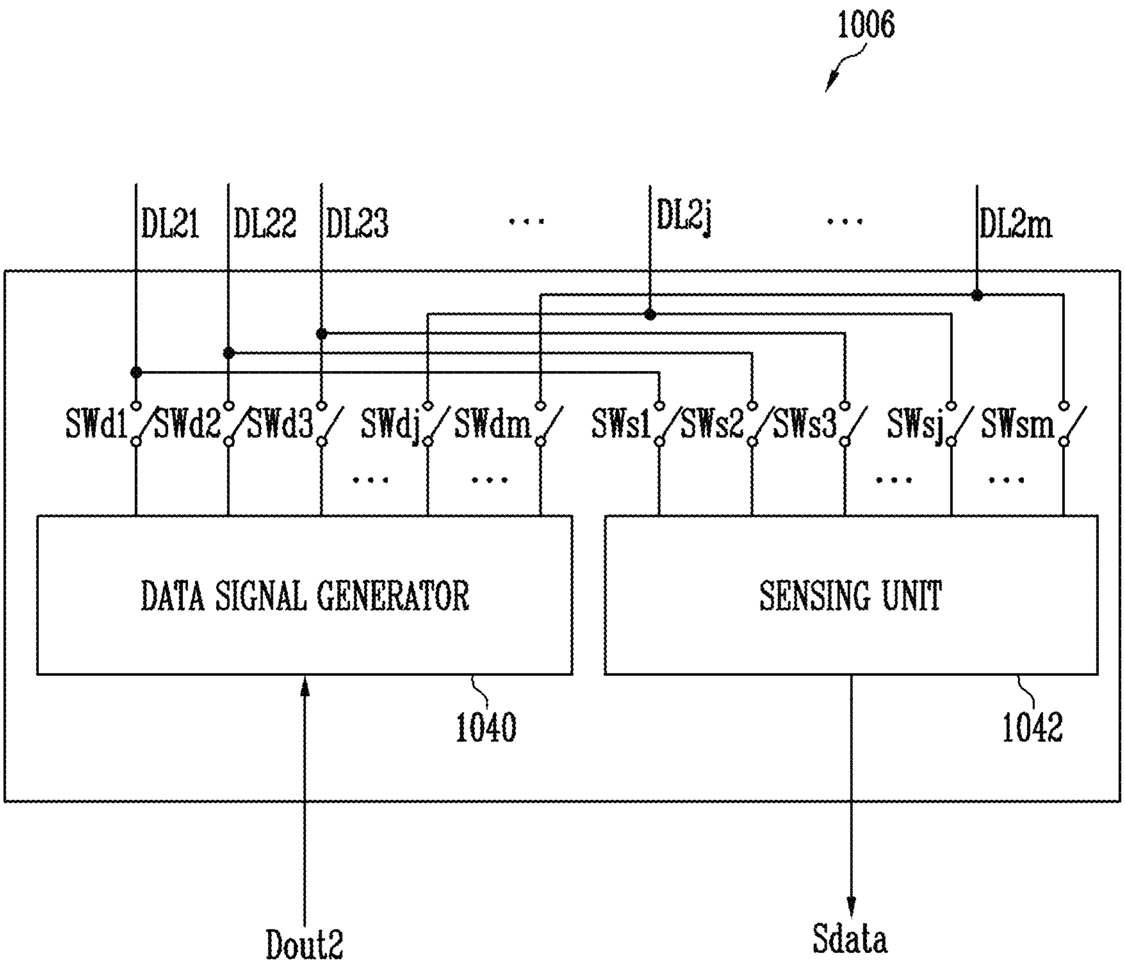
FIG. 12 is a diagram illustrating an embodiment of a second data driver shown in FIG. 11.

FIG. 12 is a diagram illustrating an embodiment of the second data driver shown in FIG. 11.

Referring to FIG. 12, the second data driver 1006 may include a data signal generator 1040 and a sensing unit 1042. Data switches SWd1, SWd2, SWd3, . . . , SWdj, . . . , and SWdm may be connected between each of the second data lines DL21 to DL2*m* and each channel of the data signal generator 1040, and sensing switches SWs1, SWs2, SWs3, . . . , SWsj, . . . , and SWsm may be connected between each of the second data lines DL21 to DL2*m* and a channel of the sensing unit 1042.

Figure 13:
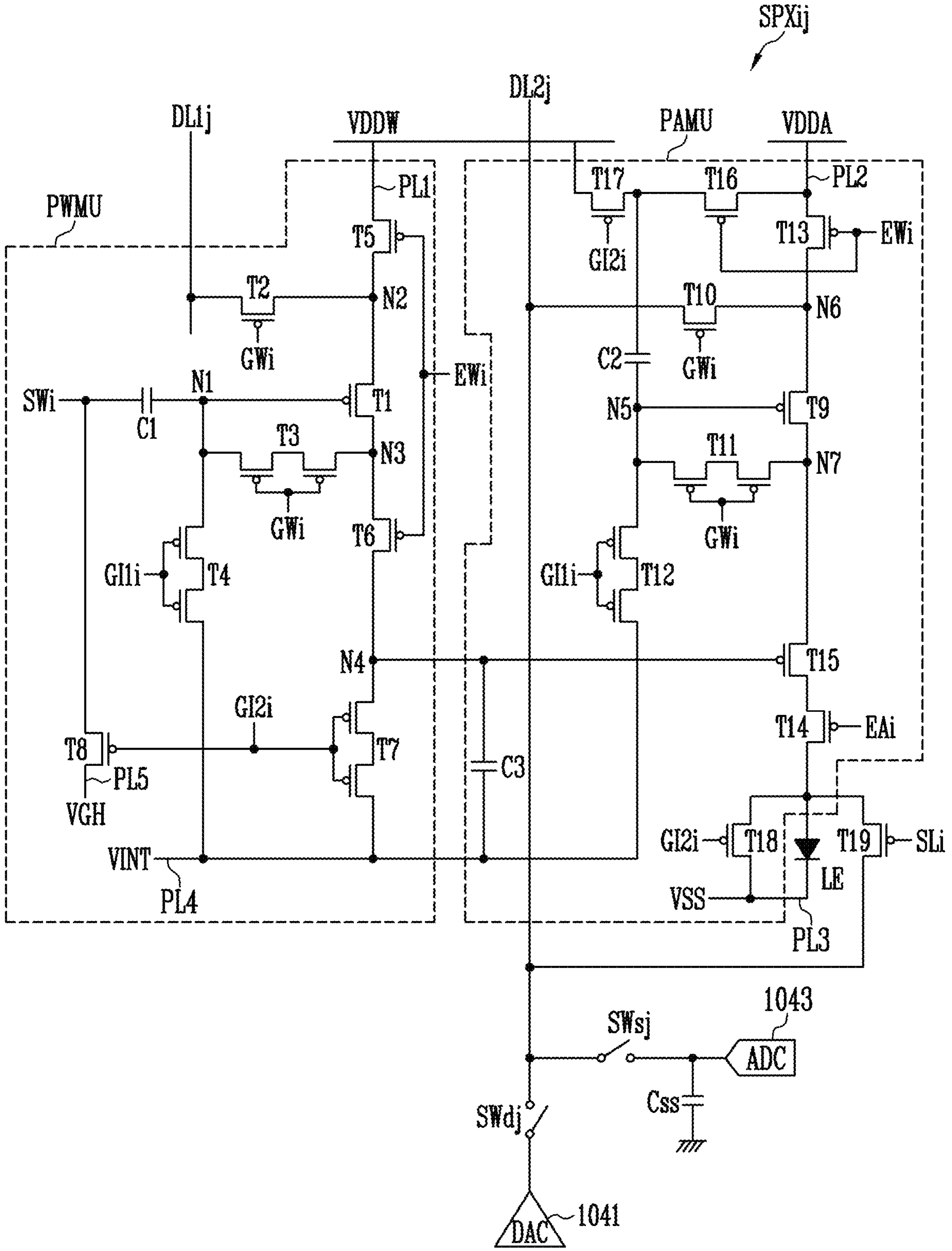
FIG. 13 is a circuit diagram illustrating a sub-pixel according to one or more embodiments of the present disclosure.
Figure 15:
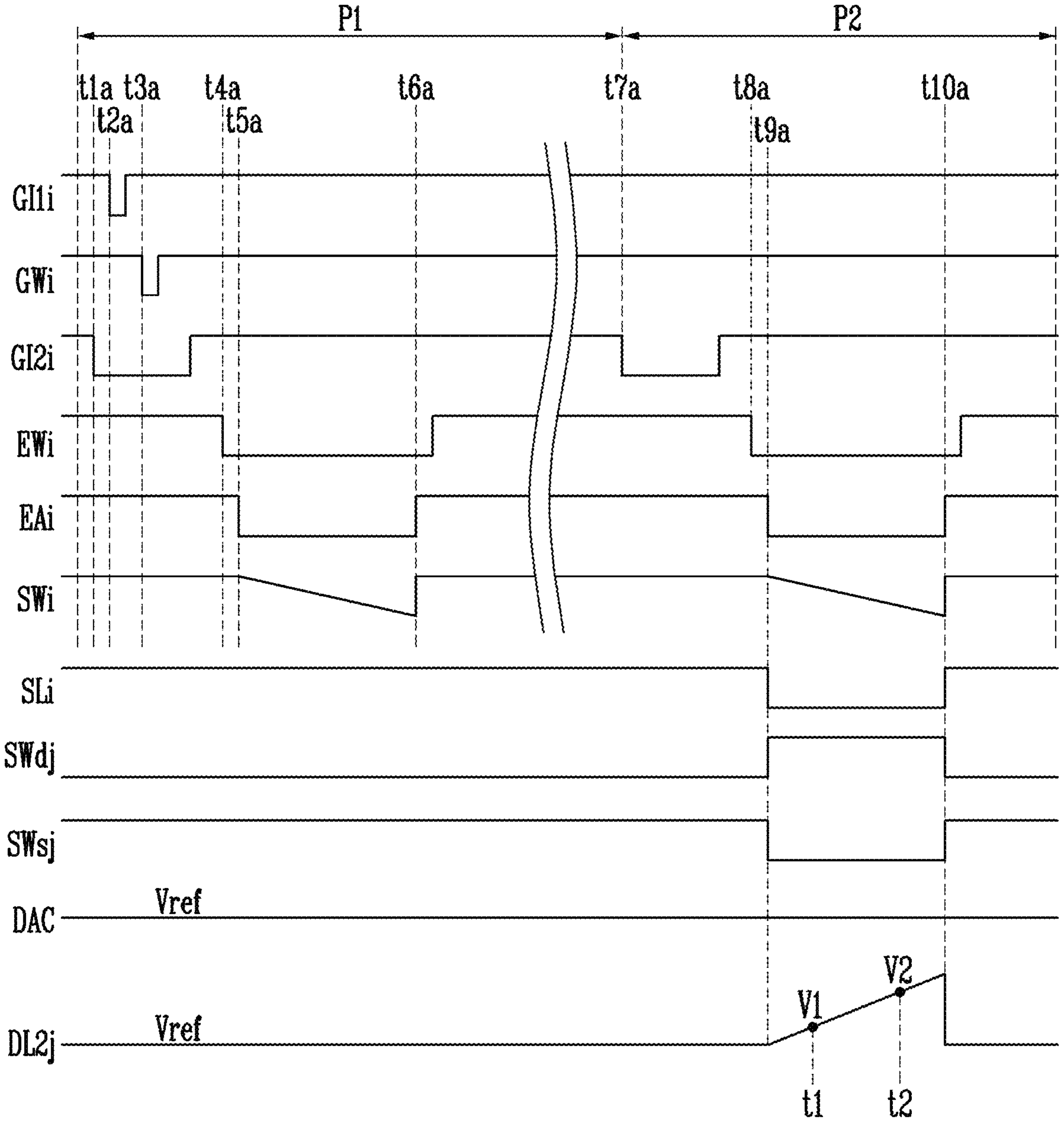
FIG. 15 is a waveform diagram illustrating a method of driving the sub-pixel of FIG. 13 during a sensing period.

The data signal generator 1040 may receive the second output data Dout2 and generate the second data signal using the second output data Dout2. For example, the data signal generator 1040 may generate the second data signal during the normal period and supply the second data signal to the second data lines DL21 to DL2*m* via the data switches SWd1 to SWdm. In addition, the data signal generator 1040 may generate reference power Vref as shown in FIG. 15 during the sensing period, and supply the reference power Vref to the second data lines DL21 to DL2*m* via the data switches SWd1 to SWdm. In one or more embodiments, the data signal generator 1040 may include a digital-to-analog converter (DAC) for each channel as shown in FIG. 13. In addition, the data signal generator 1040 may further include various configurations, for example, a shift registers, latches, and buffers to generate the second data signal.

The channel of the sensing unit 1042 may be connected to the second data lines DL21 to DL2*m* via the sensing switches SWs1 to SWsm. The sensing unit 1042 may receive a sensing voltage from the second data lines DL21 to DL2*m* during the sensing period, change the sensing voltage to the sensing data Sdata, and supply the sensing data Sdata to the timing controller 1002. In one or more embodiments, the sensing unit 1042 may include an analog-to-digital converter (ADC) to share each channel or a plurality of channels as shown in FIG. 13. In addition, the sensing unit 1042 may additionally include various configurations to generate the sensing data Sdata.

Any one of the data switches SWd1 to SWdm may be connected to any one of the second data lines DL21 to DL2*m*. For example, a j-th data switch SWdj may be connected to a j-th second data line DL2*j*. For example, each of the data switches SWd1 to SWdm may be connected to different channels of the data signal generator 1040. The data switches SWd1 to SWdm may maintain a turn-on state during the normal period. In addition, as shown in FIG. 15, the data switches SWd1 to SWdm may be set to a turn-on state during a first period P1 of the sensing period and set to a turn-off state during a second period P2 of the sensing period.

Any one of the sensing switches SWs1 to SWsm may be connected to any one of the second data lines DL21 to DL2*m*. For example, a j-th sensing switch SWsj may be connected to the j-th second data line DL2*j*. For example, each of the sensing switches SWs1 to SWsm may be connected to different channels of the sensing unit 1042. Such sensing switches SWs1 to SWsm may maintain a turn-off state during the normal period. In addition, as shown in FIG. 15, the sensing switches SWs1 to SWsm may be set to a turn-off state during the first period P1 of the sensing period and set to a turn-on state during the second period P2 of the sensing period.

FIG. 13 is a circuit diagram illustrating a sub-pixel according to one or more embodiments of the present disclosure. FIG. 13 shows a sub-pixel positioned in an i-th pixel row and a j-th pixel column.

Referring to FIG. 13, the sub-pixel SPXij according to one or more embodiments of the present disclosure may include a first circuit unit PWMU, a second circuit unit PAMU, a light emitting element LE, and a sensing transistor T19. Hereinafter, for convenience of description, it is assumed that the sub-pixel SPXij is the first sub-pixel corresponding to the first color.

The light emitting element LE may be an inorganic light emitting element having an inorganic semiconductor. For example, the light emitting element LE may be a flip chip type of micro light emitting diode element. In one or more embodiments, the light emitting element LE may be configured of an organic light emitting diode, a quantum dot light emitting diode, or the like. In addition, although only one light emitting element LE is shown in FIG. 13, the light emitting element LE may be configured of a plurality of ultra-small light emitting elements. For example, the plurality of ultra-small light emitting elements may be connected in series, in parallel, or in series and parallel.

The first circuit unit PWMU may control a supply period of the driving current supplied to the light emitting element LE based on the first data signal received from the first data line DL1*j*. The first data signal may be set to different voltages corresponding to a grayscale (e.g., a gray level) to be expressed.

The first circuit unit PWMU may be a pulse width modulation (PWM) circuit unit. When the supply period of the driving current is decreased, an emission period of the sub-pixel SPXij is decreased, and thus a luminance of the sub-pixel SPXij may decrease. When the supply period of the driving current is increased, the emission period of the sub-pixel SPXij is increased, and thus the luminance of the sub-pixel SPXij may increase.

The second circuit unit PAMU may supply the driving current to the light emitting element LE based on the second data signal received from the second data line DL2*j*. The second circuit unit PAMU may be a pulse amplitude modulation (PAM) circuit unit. A voltage value of the second data signal may be set so that a second driving transistor T9 included in the second circuit unit PAMU may be driven in a linear area. In this case, the second driving transistor T9 may supply a constant current as the driving current to the light emitting element LE.

Sub-pixels of different colors may include light emitting elements LE having different characteristics. Therefore, the second data signal of different voltages may be supplied to the sub-pixels of the different colors.

In one or more embodiments, circuit elements (for example, a thirteenth transistor T13, a ninth transistor T9, a fifteenth transistor T15, and a fourteenth transistor T14) positioned in the current path for supplying the driving current may have different characteristics (for example, different mobility). The voltage value of the second data signal may be set so that the characteristic of the circuit elements positioned in the current path is compensated. In this case, the second data signal of the different voltages may also be supplied to sub-pixels of the same color. For example, the second data signal may be set so that light of substantially the same luminance may be generated from a light emitting element included in each of the same sub-pixels.

A first electrode of the sensing transistor T19 may be connected to a first electrode (or an anode electrode) of the light emitting element LE, and a second electrode may be connected to the second data line DL2*j*. A gate electrode of the sensing transistor T19 may be connected to the sensing line SLi. The sensing transistor T19 may be turned on when the sensing signal is supplied to the sensing line SLi to electrically connect the first electrode of the light emitting element LE and the second data line DL2*j*.

Transistors in the present disclosure may be configured of P-type transistors. In one or more embodiments, the transistors may be configured of N-type transistors. In one or more embodiments, the transistors may be configured of a combination of an N-type transistor and a P-type transistor. The transistor may be configured in various forms such as a thin film transistor (TFT), a field effect transistor (FET), and/or a bipolar junction transistor (BJT).

The first circuit unit PWMU may include first to eighth transistors T1 to T8 and a first capacitor C1.

A first electrode of the first transistor T1 (or a first driving transistor) is connected to a second node N2, and a second electrode is connected to a third node N3. In addition, a gate electrode of the first transistor T1 is connected to a first node N1. The first transistor T1 may control an amount (or a magnitude) of current flowing from a first power line PL1 to which first power VDDW is supplied to a fourth node N4 in response to a voltage of the first node N1. The first power VDDW may be set to a sufficiently high voltage so that a current may flow from the first power line PL1 to the fourth node N4.

A first electrode of the second transistor T2 is connected to the first data line DL1*j*, and a second electrode is connected to the second node N2. In addition, a gate electrode of the second transistor T2 is connected to the scan line GWi. The second transistor T2 is turned on when the scan signal is supplied to the scan line GWi to electrically connect the first data line DL1*j* and the second node N2.

A first electrode of the third transistor T3 is connected to the third node N3, and a second electrode is connected to the first node N1. In addition, a gate electrode of the third transistor T3 is connected to the scan line GWi. The third transistor T3 is turned on when the scan signal is supplied to the scan line GWi to electrically connect the first node N1 and the third node N3. When the third transistor T3 is turned on, the first transistor T1 may be connected in a diode form (e.g., the third transistor T3 may be diode connected). In one or more embodiments, the third transistor T3 may include two transistors connected in series.

A first electrode of the fourth transistor T4 is connected to the first node N1, and a second electrode is connected to a fourth power line PL4. In addition, a gate electrode of the fourth transistor T4 is connected to the first initialization line GI1*i*. The fourth transistor T4 may be turned on when a first initialization signal is supplied to the first initialization line GI1*i* to electrically connect the fourth power line PL4 and the first node N1. That is, when the fourth transistor T4 is turned on, a voltage of initialization power VINT may be supplied to the first node N1. The initialization power VINT may be set to a voltage lower than the first data signal supplied to the first data line DL1*j*. In one or more embodiments, the fourth transistor T4 may include two transistors connected in series.

A first electrode of the fifth transistor T5 is connected to the first power line PL1, and a second electrode is connected to the second node N2. In addition, a gate electrode of the fifth transistor T5 may be connected to the first emission control line EWi. The fifth transistor T5 may be turned on when a first emission control signal is supplied to the first emission control line EWi to electrically connect the first power line PL1 and the second node N2.

A first electrode of the sixth transistor T6 is connected to the third node N3, and a second electrode is connected to the fourth node N4. In addition, a gate electrode of the sixth transistor T6 is connected to the first emission control line EWi. The sixth transistor T6 may be turned on when the first emission control signal is supplied to the first emission control line EWi to electrically connect the third node N3 and the fourth node N4.

A first electrode of the seventh transistor T7 is connected to the fourth node N4, and a second electrode is connected to the fourth power line PL4. In addition, a gate electrode of the seventh transistor T7 is connected to the second initialization line GI2. The seventh transistor T7 may be turned on when a second initialization signal is supplied to the second initialization line GI2 to electrically connect the fourth power line PL4 and the fourth node N4. In one or more embodiments, the seventh transistor T7 may include two transistors connected in series.

A first electrode of the eighth transistor T8 is connected to the sweep line SWi, and a second electrode is connected to a fifth power line PL5. In addition, a gate electrode of the eighth transistor T8 is connected to the second initialization line GI2*i*. The eighth transistor T8 may be turned on when the second initialization signal is supplied to the second initialization line GI2*i* to electrically connect the fifth power line PL5 and the sweep line SWi.

A first electrode of the first capacitor C1 is connected to the sweep line SWi and a second electrode of the first capacitor C1 is connected to the first node N1. The first capacitor C1 may transfer a voltage change of the sweep line SWi to the first node N1.

In one or more embodiments, each of the third transistor T3, the fourth transistor T4, and the seventh transistor T7 may include sub-transistors connected in series. In this case, a leakage current of the first node N1 and the fourth node N4 may be reduced or minimized.

The second circuit unit PAMU may include ninth to eighteenth transistors T9 to T18, a second capacitor C2, and a third capacitor C3.

A first electrode of the ninth transistor T9 (or a second driving transistor) is connected to a sixth node N6, and a second electrode is connected to a seventh node N7. In addition, a gate electrode of the ninth transistor T9 is connected to a fifth node N5. The ninth transistor T9 may control the current amount of the driving current supplied to the light emitting element LE from a second power line PL2 to which second power VDDA is supplied in response to a voltage of the fifth node N5. At this time, the driving current may be supplied to the light emitting element LD via a current path from the second power line PL2 to the thirteenth transistor T13, the ninth transistor T9, the fifteenth transistor T15, and the fourteenth transistor T14. The second power VDDA may be set to a voltage higher than third power VSS connected to a second electrode (or a cathode electrode) of the light emitting element LE.

A first electrode of the tenth transistor T10 is connected to the second data line DL2*j*, and a second electrode is connected to the sixth node N6. In addition, a gate electrode of the tenth transistor T10 is connected to the scan line GWi. The tenth transistor T10 may be turned on when the scan signal is supplied to the scan line GWi to electrically connect the second data line DL2*j* and the sixth node N6.

A first electrode of the eleventh transistor T11 is connected to the seventh node N7, and a second electrode is connected to the fifth node N5. In addition, a gate electrode of the eleventh transistor T11 is connected to the scan line GWi. The eleventh transistor T11 may be turned on when the scan signal is supplied to the scan line GWi to electrically connect the fifth node N5 and the seventh node N7. When the eleventh transistor T11 is turned on, the ninth transistor T9 may be connected in a diode form (e.g., the ninth transistor T9 may be diode connected). In one or more embodiments, the eleventh transistor T11 may include two transistors connected in series.

A first electrode of the twelfth transistor T12 is connected to the fifth node N5, and a second electrode is connected to the fourth power line PL4. In addition, a gate electrode of the twelfth transistor T12 is connected to the first initialization line GI1*i*. The twelfth transistor T12 may be turned on when the first initialization signal is supplied to the first initialization line GI1*i* to electrically connect the fourth power line PL4 and the fifth node N5. That is, when the twelfth transistor T12 is turned on, a voltage of the initialization power VINT may be supplied to the fifth node N5. The initialization power VINT may be set to a voltage lower than the second data signal supplied to the second data line DL2*j*. In one or more embodiments, the twelfth transistor T12 may include two transistors connected in series.

A first electrode of the thirteenth transistor T13 is connected to the second power line PL2, and a second electrode is connected to the sixth node N6. In addition, a gate electrode of the thirteenth transistor T13 may be connected to the first emission control line EWi. The thirteenth transistor T13 may be turned on when the first emission control signal is supplied to the first emission control line EWi to electrically connect the second power line PL2 and the sixth node N6.

A first electrode of the fourteenth transistor T14 is connected to a second electrode of the fifteenth transistor T15, and a second electrode is connected to the first electrode of the light emitting element LE. In addition, a gate electrode of the fourteenth transistor T14 is connected to the second emission control line EAi. The fourteenth transistor T14 may be turned on when the second emission control signal is supplied to the second emission control line EAi to electrically connect the second electrode of the fifteenth transistor T15 and the first electrode of the light emitting element LE.

A first electrode of the fifteenth transistor T15 is connected to the seventh node N7, and the second electrode is connected to the first electrode of the fourteenth transistor T14. In addition, a gate electrode of the fifteenth transistor T15 is connected to the fourth node N4. The fifteenth transistor T15 may be turned on or off in response to a voltage of the fourth node N4.

A first electrode of the sixteenth transistor T16 is connected to the second power line PL2, and a second electrode is connected to a first electrode of the second capacitor C2. In addition, a gate electrode of the sixteenth transistor T16 is connected to the first emission control line EWi. The sixteenth transistor T16 may be turned on when the first emission control signal is supplied to the first emission control line EWi. When the sixteenth transistor T16 is turned on, a voltage of the second power VDDA may be supplied to the first electrode of the second capacitor C2.

A first electrode of the seventeenth transistor T17 is connected to the first power line PL1, and a second electrode is connected to the first electrode of the second capacitor C2. In addition, a gate electrode of the seventeenth transistor T17 is connected to the second initialization line GI2*i*. The seventeenth transistor T17 may be turned on when the second initialization signal is supplied to the second initialization line GI2*i*. When the seventeenth transistor T17 is turned on, a voltage of the first power VDDW may be supplied to the first electrode of the second capacitor C2.

A first electrode of the eighteenth transistor T18 is connected to the first electrode of the light emitting element LE, and a second electrode is connected to a third power line PL3. In addition, a gate electrode of the eighteenth transistor T18 is connected to the second initialization line GI2*i*. The eighteenth transistor T18 may be turned on when the second initialization signal is supplied to the second initialization line GI2*i*. When the eighteenth transistor T18 is turned on, a voltage of the third power VSS may be supplied to the first electrode of the light emitting element LE.

A first electrode of the second capacitor C2 is connected to a common node of the sixteenth transistor T16 and the seventeenth transistor T17, and a second electrode is connected to the fifth node N5. The second capacitor C2 may store a voltage corresponding to the second data signal.

The third capacitor C3 is connected between the fourth node N4 and the fourth power line PL4. The third capacitor C3 may stabilize the voltage of the fourth node N4.

In one or more embodiments, each of the eleventh transistor T11 and the twelfth transistor T12 may include sub-transistors connected in series. In this case, a leakage current of the fifth node N5 may be reduced or minimized.

In one or more embodiments, the second data line DL2*j* may be connected to a digital to analog converter (DAC) 1041 included in the data signal generator 1040 via the data switch SWdj. Here, the DAC 1041 may be an output terminal of a specific channel of the data signal generator 1040.

In one or more embodiments, the second data line DL2*j* may be connected to an analog to digital converter (ADC) 1043 included in the sensing unit 1042 via the sensing switch SWsj. Here, the ADC 1043 may be an input terminal of a specific channel of the sensing unit 1042. Additionally, a sensing capacitor Css may be connected between a common terminal of the sensing switch SWsj and the ADC 1043, and a ground potential (for example, GND). The sensing capacitor Css may store a suitable sensing voltage (e.g., a predetermined sensing voltage) in response to the driving current supplied from the sub-pixel SPXij during the sensing period.

Figure 14:
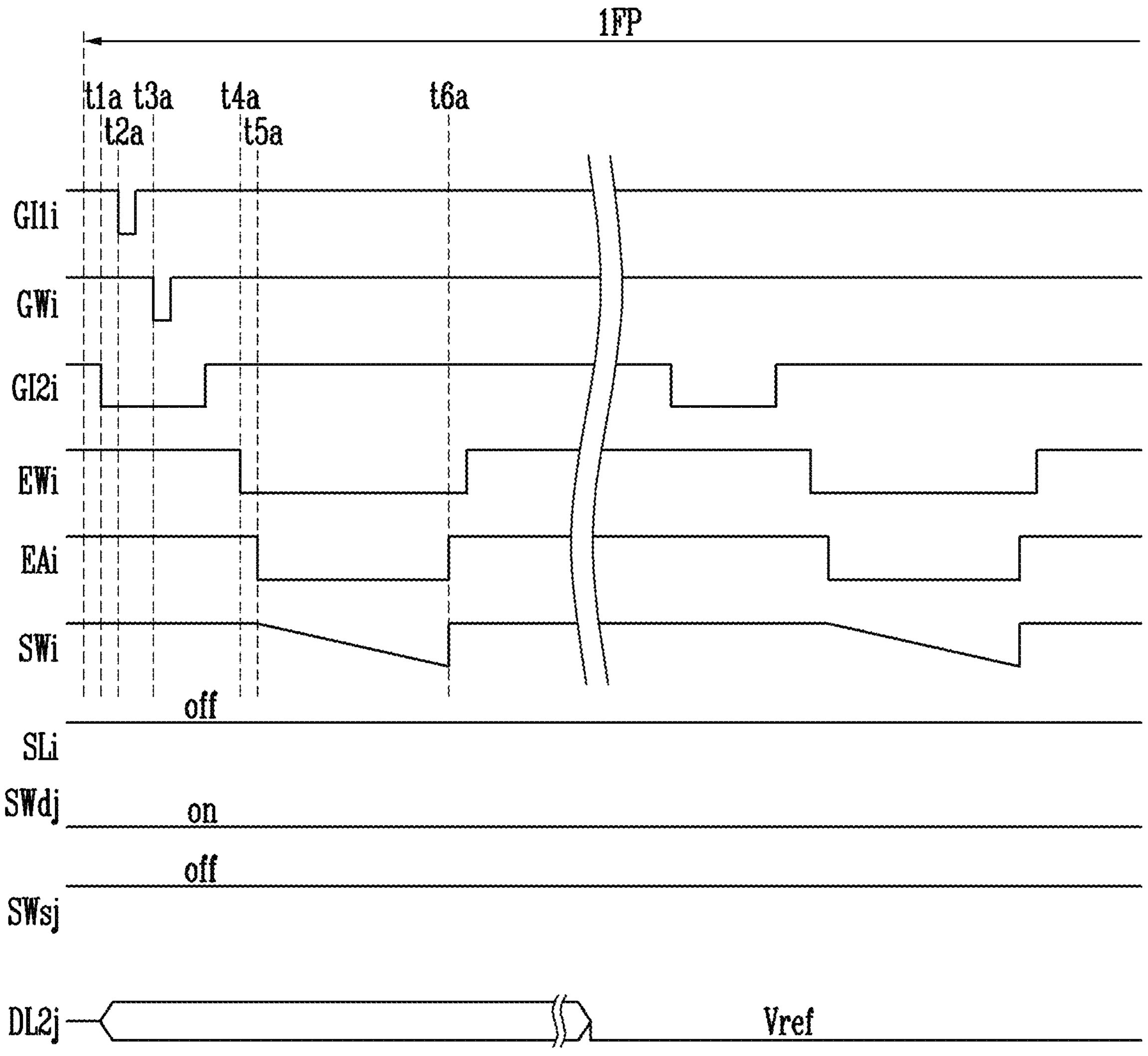
FIG. 14 is a waveform diagram illustrating a method of driving the sub-pixel of FIG. 13 during a normal period.

FIG. 14 is a waveform diagram illustrating a method of driving the sub-pixel of FIG. 13 during the normal period. FIG. 14 may illustrate a driving waveform supplied during one frame period 1FP.

Referring to FIG. 14, during the normal period, the data switch SWdj may be set to a turn-on state, and the sensing switch SWsj may be set to a turn-off state. Therefore, during the normal period, the second data line DL2*j* may be connected to the DAC 1041 of the data signal generator 1040.

First, at a first time point t1*a*, the second initialization signal of a turn-on level (for example, a low voltage) may be supplied to the second initialization line GI2*i*. When the second initialization signal is supplied to the second initialization line GI2*i*, the seventh transistor T7, the eighth transistor T8, the seventeenth transistor T17, and the eighteenth transistor T18 may be turned on.

When the seventh transistor T7 is turned on, the voltage of the initialization power VINT may be supplied from the fourth power line PL4 to the fourth node N4. Here, the initialization power VINT may be set to a low voltage so that the fifteenth transistor T15 may be turned on, and thus the fifteenth transistor T15 may be turned on. The voltage of the fourth node N4 may be supported by the third capacitor C3.

When the eighth transistor T8 is turned on, a voltage of fourth power VGH may be supplied from the fifth power line PL5 to the sweep line SWi. The fourth power VGH may be set to a voltage higher than that of the initialization power VINT. When the seventeenth transistor T17 is turned on, the voltage of the first power VDDW may be supplied from the first power line PL1 to the first electrode of the second capacitor C2.

When the eighteenth transistor T18 is turned on, the voltage of the third power VSS may be supplied to the first electrode of the light emitting element LE. At this time, the voltage of both ends of the light emitting element LE may be set to the voltage of the third power VSS, and thus black expression ability of the light emitting element LE may be improved.

At a second time point t2*a*, the first initialization signal may be supplied to the first initialization line GI1*i*. When the first initialization signal is supplied to the first initialization line GI1*i*, the fourth transistor T4 and the twelfth transistor T12 may be turned on.

When the fourth transistor T4 is turned on, the voltage of the initialization power VINT may be supplied to the first node N1. Then, a voltage of both ends of the first capacitor C1 may be set by the fourth transistor T4 and the eighth transistor T8 in a turn-on state. For example, the voltage of the both ends of the first capacitor C1 may correspond to a difference voltage between a voltage of the fourth power VGH and the initialization power VINT. In this case, the first capacitor C1 may be initialized regardless of a voltage applied to a previous frame. When the voltage of the initialization power VINT is supplied to the first node N1, the first transistor T1 may be set to a turn-on state.

When the twelfth transistor T12 is turned on, the voltage of the initialization power VINT may be supplied to the fifth node N5. Then, a voltage of both ends of the second capacitor C2 may be set by the twelfth transistor T12 and the seventeenth transistor T17 in a turn-on state. For example, the voltage of the both ends of the second capacitor C2 may correspond to a difference voltage between the voltage of the first power VDDW and the initialization power VINT. In this case, the second capacitor C2 may be initialized regardless of the voltage applied to the previous frame. When the voltage of the initialization power VINT is supplied to the fifth node N5, the ninth transistor T9 may be set to a turn-on state.

At a third time point t3*a*, the scan signal may be supplied to the scan line GWi. When the scan signal is supplied to the scan line GWi, the second transistor T2, the third transistor T3, the tenth transistor T10, and the eleventh transistor T11 may be turned on.

When the third transistor T3 is turned on, the first transistor T1 may be connected in a diode form (e.g., the first transistor T1 is diode connected). When the second transistor T2 is turned on, the first data signal may be supplied from the first data line DL1*j* to the second node N2. The first data signal may be set to a voltage higher than that of the initialization power VINT, and thus the first data signal supplied to the second node N2 may be supplied to the first node N1 via the first transistor T1 and the third transistor T3. Because the first transistor T1 is connected in a diode form (e.g., diode connected), a voltage supplied to the first node N1 is a compensation voltage in which a threshold voltage of the first transistor T1 is reflected in the first data signal. In this case, a threshold voltage deviation due to a process deviation of the first transistor T1 may be compensated.

When the eleventh transistor T11 is turned on, the ninth transistor T9 may be connected in a diode form (e.g., the ninth transistor T9 may be diode connected). When the tenth transistor T10 is turned on, the second data signal may be supplied to the sixth node N6 from the second data line DL2*j*. The second data signal may be set to a voltage higher than that of the initialization power VINT, and thus the second data signal supplied to the sixth node N6 may be supplied to the fifth node N5 via the ninth transistor T9 and the eleventh transistor T11. Because the ninth transistor T9 is connected in a diode form (e.g., diode connected), a voltage supplied to the fifth node N5 is a compensation voltage in which a threshold voltage of the ninth transistor T9 is reflected in the second data signal. In this case, a threshold voltage deviation due to a process deviation of the ninth transistor T9 may be compensated.

In one or more embodiments, when the second data signal and a voltage corresponding to the threshold voltage of the ninth transistor T9 are stored in the fifth node N5, the first electrode of the second capacitor C2 maintains the voltage of the first power VDDW. Here, the first power VDDW may be power that does not supply the driving current to the light emitting element LE, and thus a voltage drop may be reduced or minimized compared to the second power VDDA. Therefore, a desired voltage may be stored in the second capacitor C2 regardless of the voltage drop of the second power VDDA.

At a fourth time point t4*a*, the first emission control signal may be supplied to the first emission control line EWi. When the first emission control signal is supplied to the first emission control line EWi, the fifth transistor T5, the sixth transistor T6, the thirteenth transistor T13, and the sixteenth transistor T16 may be turned on.

When the fifth transistor T5 is turned on, the first power line PL1 and the second node N2 are electrically connected. When the sixth transistor T6 is turned on, the third node N3 and the fourth node N4 are electrically connected. When the thirteenth transistor T13 is turned on, the second power line PL2 and the sixth node N6 are electrically connected. When the sixteenth transistor T16 is turned on, the second power line PL2 and the first electrode of the second capacitor C2 are electrically connected.

At a fifth time point t5*a*, the second emission control signal may be supplied to the second emission control line EAi. When the second emission control signal is supplied to the second emission control line EAi, the fourteenth transistor T14 may be turned on. When the fourteenth transistor T14 is turned on, the second electrode of the fifteenth transistor T15 and the first electrode of the light emitting element LE are electrically connected.

Accordingly, the third power is supplied to a current path via the second power line PL2, the thirteenth transistor T13, the ninth transistor T9, the fifteenth transistor T15, the fourteenth transistor T14, and the light emitting element LE. A current path connected to the third power line PL3 via the second power line PL2, the thirteenth transistor T13, the ninth transistor T9, the fifteenth transistor T15, the fourteenth transistor T14, and the light emitting element LE is formed. At this time, the ninth transistor T9 may supply a driving current corresponding to a constant current to the light emitting element LE in response to the second data signal.

In one or more embodiments, at the fifth time point t5*a*, the sweep signal may be supplied to the sweep line SWi and a voltage of the sweep signal may gradually decrease. At this time, the voltage of the first node N1 also gradually decreases due to coupling of the first capacitor C1. As the voltage of the first node N1 set at the third time point t3*a* is increased, a time point at which the first transistor T1 is turned on may be delayed. As the voltage of the first node N1 set at the third time point t3*a* is decreased, the time point at which the first transistor T1 is turned on may be earlier. When the first transistor T1 is turned on at the fifth time point t5*a* and the sixth time point t6*a*, the voltage of the fourth node N4 may be set to the voltage of the first power VDDW, and thus the fifteenth transistor T15 is turned off.

When the fifteenth transistor T15 is turned off, the current path may be blocked, and thus the supply of the driving current to the light emitting element LE may be stopped. Therefore, the light emitting element LE may be set to a non-emission state. As a stop time point of the driving current is earlier, a luminance of the sub-pixel SPXij visually recognized in the corresponding frame period 1FP may be decreased. As the stop time point of the driving current is later, the luminance of the sub-pixel SPXij visually recognized in the corresponding frame period 1FP may be increased.

In one or more embodiments, when the sub-pixel SPXij is set to emit white light in the frame period 1FP, the supply of the second emission control signal to the second emission control line EAi may be stopped at a sixth time point t6*a* (that is, a voltage of a turn-off level may be applied), the supply of the driving current may be stopped as the fourteenth transistor T14 is turned off.

In one or more embodiments, the second initialization signal, the first emission control signal, the second emission control signal, and the sweep signal may be repeatedly supplied also after the sixth time point t6*a* of the corresponding frame period 1FP, and thus the light emitting element LE may repeatedly emit light in response to the first data signal and the second data signal stored at the third time point t3*a*. Accordingly, during the corresponding frame period 1FP, the sub-pixel SPXij may create a desired luminance waveform.

In one or more embodiments, the sub-pixel SPXij of FIG. 13 may compensate for the threshold voltage of the first transistor T1 and the ninth transistor T9 in a circuit aspect, and thus a luminance may be implemented regardless of the threshold voltage of the first transistor T1 and the ninth transistor T9. For example, when expressing 255 grayscales (e.g., 255 gray levels), when the threshold voltage of the first transistor T1 is changed by ±0.5V, the luminance of the sub-pixel SPXij is hardly changed, and when the threshold voltage of the ninth transistor T9 is changed by ±0.5V, the luminance of the sub-pixel SPXij may be changed by about 1.2%.

However, because mobility of the ninth transistor T9 is not compensated, the luminance of the sub-pixel SPXij of FIG. 13 may be changed in response to a change of the mobility. For example, when expressing 255 grayscales (e.g., 255 gray levels), in a case where mobility of the first transistor T1 is changed by ±15%, the luminance of the sub-pixel SPXij is changed by about 0.1%, and in a case where the mobility of the ninth transistor T9 is changed by ±15%, the luminance of the sub-pixel SPXij is changed by about 16.6%. That is, a luminance deviation may occur due to a mobility deviation of the ninth transistor T9.

In one or more embodiments of the present disclosure, the second data signal may be compensated using the sensing data Sdata of the sensing unit 1042 so that the mobility deviation may be compensated, and thus a uniform luminance may be implemented regardless of the mobility deviation.

FIG. 15 is a waveform diagram illustrating a method of driving the sub-pixel of FIG. 13 during the sensing period. The sensing period may be included at a time point when the display device 10 is turned on or off. Additionally, the sensing period may be included at least once in a process of the display device 10, and thus before the display device 10 is shipped, the sensing data Sdata corresponding to each of the sub-pixels SPX may be stored in the timing controller 1002. When describing FIG. 15, a portion overlapping FIG. 14 is briefly described.

During the sensing period, the first data driver 1004 may supply the first data signal corresponding to a white grayscale (e.g., white gray level) to the data lines DL11 to DL1*m*. When the first data signal corresponding to the white grayscale (e.g., white gray level) is supplied, the fifteenth transistor T15 may maintain a turned-on state during a long time, and thus the sensing voltage may be sensed during a sufficient time. During the sensing period, the second data driver 1006 may supply the reference power Vref to the second data lines DL21 to DL2*m*. The reference power Vref may be set to a voltage at which the ninth transistor T9 may be turned on.

Referring to FIG. 15, the sensing period is divided into a first period P1 and a second period P2 and driven. The first period P1 may be a period in which the first data signal and the second data signal are stored, and the second period P2 may be a period in which the sensing data Sdata is generated.

During the first period P1, the data switch SWdj may be set to a turn-on state (e.g., the data switch SWdj may be supplied with a low-level voltage), and the sensing switch SWsj may be set to a turn-off state (e.g., the sensing switch SWsj may be supplied with a high-level voltage). Therefore, during the first period P1, the second data line DL2*j* may be connected to the DAC 1041 of the data signal generator 1040.

At the first time point t1*a*, the seventh transistor T7, the eighth transistor T8, the seventeenth transistor T17, and the eighteenth transistor T18 may be turned on by the second initialization signal. Then, the initialization power VINT may be supplied to the fourth node N4, the fourth power VGH may be supplied to the sweep line SWi, and the voltage of the first power VDDW may be supplied to the first electrode of the second capacitor C2. In addition, because the voltage of the both ends of the light emitting element LE may be set to the voltage of the third power VSS, the black expression ability of the light emitting element LE may be improved.

At the second time point t2*a*, the fourth transistor T4 and the twelfth transistor T12 may be turned on by the first initialization signal. Then, the voltage of the initialization power VINT may be supplied to the first node N1 and the fifth node N5.

At the third time point t3*a*, the second transistor T2, the third transistor T3, the tenth transistor T10, and the eleventh transistor T11 may be turned on by the scan signal. The first data signal supplied to the first data line DL1*j* may be supplied to the first node N1 via the second transistor T2, the first transistor T1, and the third transistor T3. Here, the first data signal may be set to a voltage corresponding to the highest grayscale (e.g., the highest gray level), for example, a white grayscale (e.g., a white gray level).

The second data signal (that is, the reference power Vref) supplied to the second data line DL2*j* may be supplied to the fifth node N5 via the tenth transistor T10, the ninth transistor T9, and the eleventh transistor T11. Here, the second data signal may be set to a voltage at which the ninth transistor T9 may be turned on.

At the fourth time point t4*a*, the fifth transistor T5, the sixth transistor T6, the thirteenth transistor T13, and the sixteenth transistor T16 may be turned on by the first emission control signal. At the fifth time point t5*a*, the fourteenth transistor T14 may be turned on by the second emission control signal. Then, a current path connected to the third power line PL3 via the second power line PL2, the thirteenth transistor T13, the ninth transistor T9, the fifteenth transistor T15, the fourteenth transistor T14, and the light emitting element LE is formed.

At a seventh time point t7*a* of the second period P2, the second initialization signal may be supplied to the second initialization line GI2*i*. When the second initialization signal is supplied to the second initialization line GI2*i*, the seventh transistor T7, the eighth transistor T8, the seventeenth transistor T17, and the eighteenth transistor T18 may be turned on.

When the seventh transistor T7 is turned on, the fourth node N4 may be initialized to the voltage of the initialization power VINT. When the eighth transistor T8 is turned on, the sweep line SWi may be initialized to the voltage of the fourth power VGH. When the seventeenth transistor T17 is turned on, the first electrode of the second capacitor C2 may be initialized to the voltage of the first power VDDW. When the eighteenth transistor T18 is turned on, the voltage of the both ends of the light emitting element LE may be set to the voltage of the third power VSS, and thus the black expression ability of the light emitting element LE may be improved.

At an eighth time point t8*a* of the second period P2, the fifth transistor T5, the sixth transistor T6, the thirteenth transistor T13, and the sixteenth transistor T16 may be turned on by the first emission control signal supplied to the first emission control line EWi.

At a ninth time point t9*a* of the second period P2, the fourteenth transistor T14 may be turned on by the second emission control signal supplied to the second emission control line EAi. In addition, at the ninth time point t9*a*, the sensing transistor T19 may be turned on by the sensing signal supplied to the sensing line SLi.

Then, a current path connected to the second data line DL2*j* via the second power line PL2, the thirteenth transistor T13, the ninth transistor T9, the fifteenth transistor T15, the fourteenth transistor T14, and the sensing transistor T19 is formed.

During a period between a ninth time point t9*a* and a tenth time point t10*a*, the data switch SWdj may be set to a turn-off state and the sensing switch SWsj may be set to a turn-on state. When the data switch SWdj is turned off, an electrical connection between the second data line DL2*j* and the DAC 1041 is cut off. When the sensing switch SWsj is turned on, the second data line DL2*j* and the ADC 1043 are electrically connected.

Then, between the ninth time point t9*a* and the tenth time point t10*a*, the driving current supplied from the ninth transistor T9 may be supplied to the sensing capacitor Css via the second data line DL2*j*.

When the driving current is supplied to the sensing capacitor Css, a voltage of the sensing capacitor Css increases. At the tenth time point t10*a*, the sensing switch SWsj may be turned off, and thus the sensing voltage stored in the sensing capacitor Css may be maintained. The driving current supplied from the ninth transistor T9 may be obtained as in Equation 1.

$$I = C \times (V2 - V1)/(t2 - t1) \quad \text{[Equation 1]}$$

In Equation 1, I is a driving current (or sensing current) of the ninth transistor T9, C is a capacitance of the sensing capacitor Css, V2 is the sensing voltage at the second time point t2, and V1 is the sensing voltage at the first time point t1.

Assuming that a slope of the sensing voltage is linear, because the sensing voltage at the first time point t1 and the sensing voltage at the second time point t2 are known, the driving current of the ninth transistor T9 may be calculated. In addition, the mobility of the ninth transistor T9 may be calculated using the calculated driving current (that is, the mobility may be calculated using the slope of the sensing voltage). For example, as the sensing current is increased, the mobility may be increased. For example, a size of the mobility may be proportional to a size of the sensing current. Meanwhile, the calculated mobility may include characteristic information (or mobility information) of the circuit elements T13, T9, T15, T14, and T19 positioned in the current path.

The mobility information calculated (or generated) by the second data driver 1006 (or the sensing unit 1042) may be included in the sensing data Sdata and supplied to the timing controller 1002. During the sensing period, the mobility information (that is, the sensing data Sdata) corresponding to each of the sub-pixels SPX may be stored in the timing controller 1002. Additionally, the mobility information may be stored in a unit of a plurality of sub-pixels SPX. For example, the mobility information of the plurality of sub-pixels SPX may be averaged and the mobility information may be stored in the unit of the plurality of sub-pixels SPX.

The timing controller 1002 may generate the second data signal so that the mobility may be corrected using the sensing data Sdata of each of the sub-pixels SPX during the normal period. In this case, an image of a uniform luminance may be displayed regardless of the mobility deviation of the circuit elements included in a driving path.

For example, when expressing 255 grayscales (e.g., 255 gray levels), in a case where the mobility of the ninth transistor T9 is changed by ±15%, the luminance of the sub-pixel SPXij is changed by about 1.2%. That is, in one or more embodiments of the disclosure, the timing controller 1002 may supply the second data signal in which the mobility is reflected, and thus a uniform luminance may be implemented regardless of the mobility deviation of the ninth transistor T9.

Figure 16:
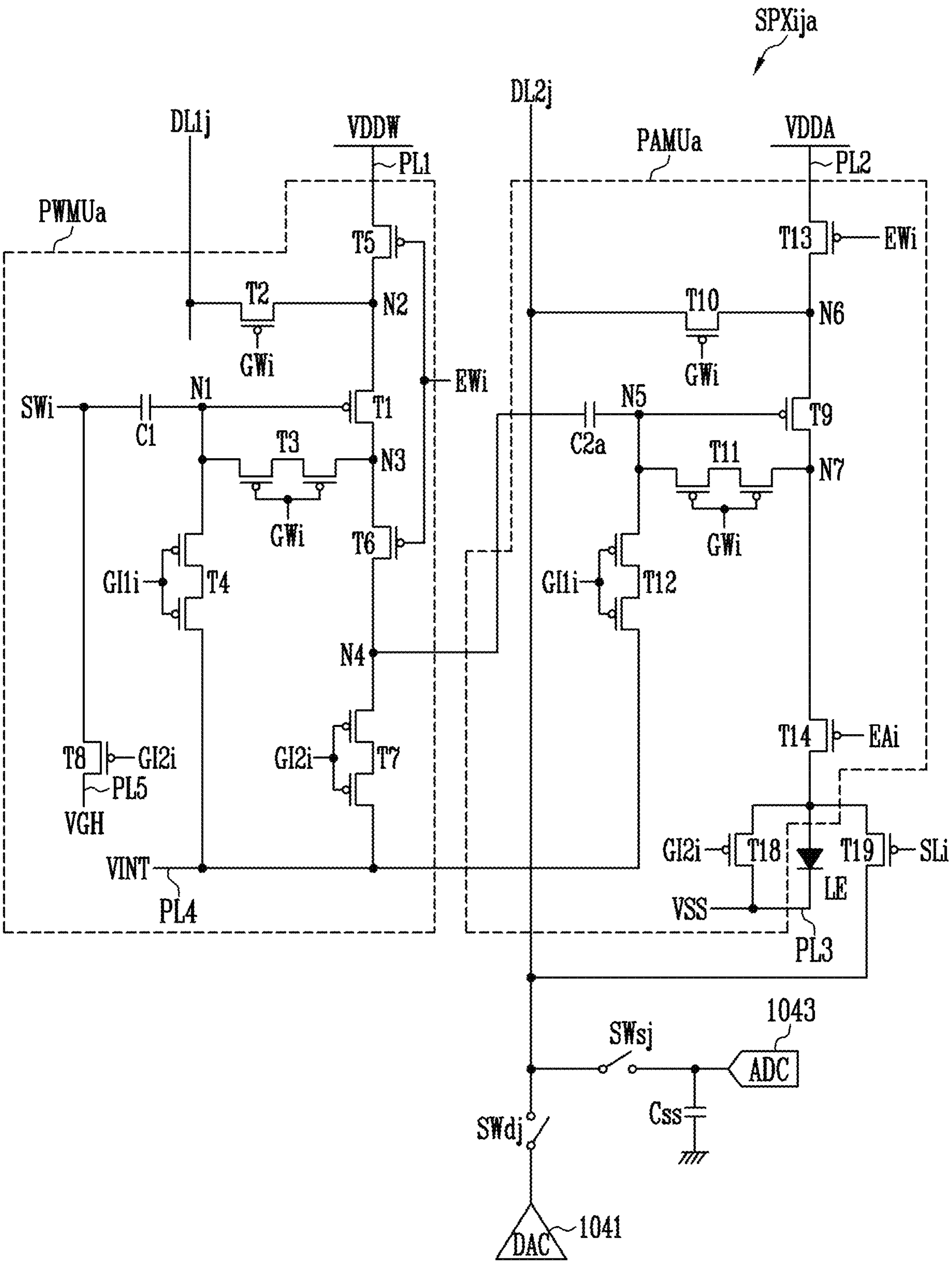
FIG. 16 is a diagram illustrating a pixel circuit according to one or more embodiments of the present disclosure.

FIG. 16 is a diagram illustrating a pixel circuit according to one or more embodiments of the present disclosure. FIG. 16 shows a sub-pixel positioned in an i-th pixel row and a j-th pixel column. When describing FIG. 16, the same reference numerals are assigned to the same configurations as those in FIG. 13 and the configurations are briefly described.

Referring to FIG. 16, the sub-pixel SPXija according to an example of the present disclosure may include a first circuit unit PWMUa, a second circuit unit PAMUa, a light emitting element LE, and a sensing transistor T19. Hereinafter, for convenience of description, it is assumed that the sub-pixel SPXija is the first sub-pixel corresponding to the first color.

The light emitting element LE may be an inorganic light emitting element having an inorganic semiconductor. For example, the light emitting element LE may be a flip chip type of micro light emitting diode element. In one or more embodiments, the light emitting element LE may be configured of an organic light emitting diode, a quantum dot light emitting diode, and/or the like. In addition, although only one light emitting element LE is shown in FIG. 16, the light emitting element LE may be configured of a plurality of ultra-small light emitting elements. For example, the plurality of ultra-small light emitting elements may be connected in series, in parallel, or in series and parallel.

The first circuit unit PWMUa may control a supply period of the driving current supplied to the light emitting element LE based on the first data signal received from the first data line DL1*j*. The first circuit unit PWMUa may be a pulse width modulation (PWM) circuit unit. When the supply period of the driving current is decreased, an emission period of the sub-pixel SPXija is decreased, and thus a luminance of the sub-pixel SPXija may decrease. When the supply period of the driving current is increased, the emission period of the sub-pixel SPXija is increased, the luminance of the sub-pixel SPXija may increase.

The second circuit unit PAMUa may supply the driving current to the light emitting element LE based on the second data signal received from the second data line DL2*j*. The second circuit unit PAMUa may be a pulse amplitude modulation (PAM) circuit unit. A voltage value of the second data signal may be set so that a second driving transistor T9 included in the second circuit unit PAMUa may be driven in a linear area. In this case, the second driving transistor T9 may supply a constant current as the driving current to the light emitting element LE.

Sub-pixels of different colors may include light emitting elements LE having different characteristics. Therefore, the second data signal of different voltages may be supplied to the sub-pixels of the different colors.

In one or more embodiments, circuit elements (for example, a thirteenth transistor T13, a ninth transistor T9, and a fourteenth transistor T14) positioned in the current path for supplying the driving current may have different characteristics (for example, different mobility). The voltage value of the second data signal may be set so that the characteristic of the circuit elements positioned in the current path is compensated. In this case, the second data signal of the different voltages may also be supplied to sub-pixels of the same color.

A first electrode of the sensing transistor T19 may be connected to a first electrode (or an anode electrode) of the light emitting element LE, and a second electrode may be connected to the second data line DL2*j*. A gate electrode of the sensing transistor T19 may be connected to the sensing line SLi. The sensing transistor T19 may be turned on when the sensing signal is supplied to the sensing line SLi to electrically connect the first electrode of the light emitting element LE and the second data line DL2*j*.

Transistors in the present disclosure may be configured of P-type transistors. In one or more embodiments, the transistors may be configured of N-type transistors. In one or more embodiment, the transistors may be configured of a combination of an N-type transistor and a P-type transistor. The transistor may be configured in various forms such as a thin film transistor (TFT), a field effect transistor (FET), and a bipolar junction transistor (BJT).

The first circuit unit PWMUa may include first to eighth transistors T1 to T8 and a first capacitor C1.

A first electrode of the first transistor T1 (or a first driving transistor) is connected to a second node N2, a second electrode is connected to a third node N3, and a gate electrode of the first transistor T1 is connected to a first node N1. A first electrode of the second transistor T2 is connected to the first data line DL1*j*, a second electrode is connected to the second node N2, and a gate electrode is connected to the scan line GWi. A first electrode of the third transistor T3 is connected to the third node N3, a second electrode is connected to the first node N1, and a gate electrode is connected to the scan line GWi. A first electrode of the fourth transistor T4 is connected to the first node N1, a second electrode is connected to a fourth power line PL4, and a gate electrode is connected to the first initialization line GI1*i*. A first electrode of the fifth transistor T5 is connected to the first power line PL1, a second electrode is connected to the second node N2, and a gate electrode is connected to the first emission control line EWi. A first electrode of the sixth transistor T6 is connected to the third node N3, a second electrode is connected to the fourth node N4, and a gate electrode is connected to the first emission control line EWi. A first electrode of the seventh transistor T7 is connected to the fourth node N4, a second electrode is connected to the fourth power line PL4, and a gate electrode is connected to the second initialization line GI2*i*. A first electrode of the eighth transistor T8 is connected to the sweep line SWi, a second electrode is connected to a fifth power line PL5, and a gate electrode is connected to the second initialization line GI2*i*. The first capacitor C1 is connected between the sweep line SWi and the first node N1.

In one or more embodiments, each of the third transistor T3, the fourth transistor T4, and the seventh transistor T7 may include sub-transistors connected in series. In this case, a leakage current of the first node N1 and the fourth node N4 may be reduced or minimized.

The second circuit unit PAMU may include ninth to fourteenth transistors T9 to T14, an eighteenth transistor T18, and a second capacitor C2*a*.

A first electrode of the ninth transistor T9 (or a second driving transistor) is connected to a sixth node N6, a second electrode is connected to a seventh node N7, and, a gate electrode is connected to a fifth node N5. A first electrode of the tenth transistor T10 is connected to the second data line DL2*j*, a second electrode is connected to the sixth node N6, and a gate electrode is connected to the scan line GWi. A first electrode of the eleventh transistor T11 is connected to the seventh node N7, a second electrode is connected to the fifth node N5, and a gate electrode is connected to the scan line GWi. A first electrode of the twelfth transistor T12 is connected to the fifth node N5, a second electrode is connected to the fourth power line PL4, and a gate electrode is connected to the first initialization line GI1*i*. A first electrode of the thirteenth transistor T13 is connected to the second power line PL2, a second electrode is connected to the sixth node N6, and a gate electrode is connected to the first emission control line EWi. A first electrode of the fourteenth transistor T14 is connected to the seventh node N7, a second electrode is connected to the first electrode of the light emitting element LE, and a gate electrode is connected to the second emission control line EAi. A first electrode of the eighteenth transistor T18 is connected to the first electrode of the light emitting element LE, a second electrode is connected to a third power line PL3, and a gate electrode is connected to the second initialization line GI2*i*. A first electrode of the second capacitor C2*a* is connected to the fourth node N4, and a second electrode is connected to the fifth node N5.

In one or more embodiments, each of the eleventh transistor T11 and the twelfth transistor T12 may include sub-transistors connected in series. In this case, a leakage current of the fifth node N5 may be reduced or minimized.

In one or more embodiments, the second data line DL2*j* may be connected to a DAC 1041 included in the data signal generator 1040 via the data switch SWdj. Here, the DAC 1041 may be an output terminal of a specific channel of the data signal generator 1040.

In one or more embodiments, the second data line DL2*j* may be connected to an ADC 1043 included in the sensing unit 1042 via the sensing switch SWsj. Here, the ADC 1043 may be an input terminal of a specific channel of the sensing unit 1042. Additionally, a sensing capacitor Css may be connected between a common terminal of the sensing switch SWsj and the ADC 1043, and a ground potential (for example, GND). The sensing capacitor Css may store a suitable sensing voltage (e.g., a predetermined sensing voltage) in response to the driving current supplied from the sub-pixel SPXij during the sensing period.

In the sub-pixel SPXija shown in FIG. 16, the second capacitor C2*a* is connected between the fourth node N4 and the fifth node N5. Therefore, when the voltage of the fourth node N4 increases to the first power VDDW, the voltage of the fifth node N5 may be increased due to coupling of the second capacitor C2*a*, and thus the ninth transistor T9 may be turned off.

That is, the sub-pixel SPXija shown in FIG. 16 may turn off the ninth transistor T9 in response to the voltage of the fourth node N4, and thus the fifteenth transistor T15 shown in FIG. 13 may be removed. In addition, because the first electrode of the second capacitor C2*a* is connected to the fourth node N4, the sixteenth transistor T16 and the seventeenth transistor T17 shown in FIG. 13 may be removed.

The sub-pixel SPXija shown in FIG. 16 may be driven in response to the driving waveform shown in FIG. 14 during the normal period and driven in response to the driving waveform shown in FIG. 15 during the sensing period. That is, because the driving method and the sensing method of the sub-pixel SPXija are the same as those of the sub-pixel SPXij of FIG. 13, an overlapping description is omitted.

Although the present disclosure has been described with reference to the embodiments of the present disclosure, those skilled in the art will understand that the present disclosure may be variously modified and changed without departing from the spirit and scope of the present disclosure described in the claims and their equivalents.

What is claimed is:

1. A display device comprising:

first sub-pixels, each of the first sub-pixels comprising a first light emitting element of a first color, wherein at least one of the first sub-pixels comprises:

a first circuit unit configured to control a supply period of a driving current in response to a first data signal supplied from a first data line in a normal period and in a sensing period;

a second circuit unit configured to supply the driving current to the first light emitting element in response to a second data signal supplied from a second data line in the normal period; and a sensing transistor having a first electrode connected to a first electrode of the first light emitting element, a second electrode directly connected to the second data line, and a gate electrode connected to a sensing line, wherein in a first period of the sensing period, a reference power as the second data signal is supplied to the second data line, wherein in a second period of the sensing period, a voltage level of the second data line is changed, wherein the second period of the sensing period is later than the first period of the sensing period, and wherein in the first period and the second period of the sensing period, the first data signal corresponding to a white grayscale is supplied to the first data line.

2. The display device according to claim 1, wherein the first data signal has different voltages corresponding to gray levels to be expressed.

3. The display device according to claim 1, wherein the second data signal is set so that light of substantially a same luminance is generated by the first light emitting element in each of the first sub-pixels.

4. The display device according to claim 1, further comprising:

a first data driver configured to receive first output data corresponding to a gray level and supply the first data signal generated in response to the first output data to the first data line;

a second data driver configured to receive second output data and supply the second data signal generated in response to the second output data to the second data line; and a timing controller configured to generate the first output data in response to input data input from an outside and generate the second output data based on sensing data stored therein.

5. The display device according to claim 4, wherein the timing controller is configured to generate the second output data so that the second data signal of different voltages are supplied to at least two first sub-pixels from among the first sub-pixels in response to the sensing data.

6. The display device according to claim 5, wherein the second data signal of the different voltages is set so that light of substantially a same luminance is generated in the first light emitting element in each of the two first sub-pixels.

7. The display device according to claim 4, wherein the second data driver comprises:

a data signal generator configured to supply the second data signal generated based on the second output data to the second data line during the normal period, and to supply the reference power to the second data line during the first period of the sensing period; and a sensing unit configured to generate the sensing data based on a sensing voltage from the sensing transistor during the second period of the sensing period except for the first period of the sensing period, and to supply the sensing data to the timing controller.

8. The display device according to claim 7, wherein the sensing unit is configured to detect mobility of circuit elements positioned in a current path of the driving current using a slope of the sensing voltage, and the sensing data comprises information on the mobility.

9. The display device according to claim 7, further comprising:

a data switch connected between the second data line and the data signal generator and turned on during the normal period and the first period of the sensing period; and a sensing switch connected between the second data line and the sensing unit and turned on during the second period of the sensing period.

10. The display device according to claim 7, wherein the first data driver is configured to supply the first data signal corresponding to a highest gray level to the first data line during the sensing period.

11. The display device according to claim 7, wherein a voltage of the reference power is set so that a second driving transistor in the second circuit unit is turned on.

12. The display device according to claim 1, wherein the first circuit unit comprises:

a first driving transistor having a gate electrode connected to a first node, a first electrode connected to a second node, and a second electrode connected to a third node;

a second transistor having a gate electrode connected to a scan line, a first electrode connected to the first data line, and a second electrode connected to the second node;

a third transistor having a gate electrode connected to the scan line, a first electrode connected to the third node, and a second electrode connected to the first node;

a fourth transistor having a gate electrode connected to a first initialization line, a first electrode connected to the first node, and a second electrode connected to a fourth power line; and a first capacitor having a first electrode connected to a sweep line and a second electrode connected to the first node.

13. The display device according to claim 1, further comprising:

second sub-pixels, each of the second sub-pixels comprising a second light emitting element of a second color different from the first color.

14. A display device comprising:

first sub-pixels, each of the first sub-pixels comprising a first light emitting element of a first color, wherein at least one of the first sub-pixels comprises:

a first circuit unit configured to control a supply period of a driving current in response to a first data signal supplied from a first data line;

a second circuit unit configured to supply the driving current to the first light emitting element in response to a second data signal supplied from a second data line; and a sensing transistor having a first electrode connected to a first electrode of the first light emitting element, a second electrode connected to the second data line, and a gate electrode connected to a sensing line, wherein the first circuit unit comprises:

a first transistor having a gate electrode connected to a first node, a first electrode connected to a second node, and a second electrode connected to a third node;

a second transistor having a gate electrode connected to a scan line, a first electrode connected to the first data line, and a second electrode connected to the second node;

a third transistor having a gate electrode connected to the scan line, a first electrode connected to the third node, and a second electrode connected to the first node;

a fourth transistor having a gate electrode connected to a first initialization line, a first electrode connected to the first node, and a second electrode connected to a fourth power line;

a first capacitor having a first electrode connected to a sweep line and a second electrode connected to the first node;

a fifth transistor having a gate electrode connected to a first emission control line, a first electrode connected to a first power line, and a second electrode connected to the second node;

a sixth transistor having a gate electrode connected to the first emission control line, a first electrode connected to the third node, and a second electrode connected to a fourth node;

a seventh transistor having a gate electrode connected to a second initialization line, a first electrode connected to the fourth node, and a second electrode connected to the fourth power line; and an eighth transistor having a gate electrode connected to the second initialization line, a first electrode connected to the sweep line, and a second electrode connected to a fifth power line.

15. The display device according to claim 14, wherein the second circuit unit comprises:

a second driving transistor having a gate electrode connected to a fifth node, a first electrode connected to a sixth node, and a second electrode connected to a seventh node;

a tenth transistor having a gate electrode connected to the scan line, a first electrode connected to the second data line, and a second electrode connected to the sixth node;

an eleventh transistor having a gate electrode connected to the scan line, a first electrode connected to the seventh node, and a second electrode connected to the fifth node;

a twelfth transistor having a gate electrode connected to the first initialization line, a first electrode connected to the fifth node, and a second electrode connected to the fourth power line;

a thirteenth transistor having a gate electrode connected to the first emission control line, a first electrode connected to a second power line, and a second electrode connected to the sixth node; and a fourteenth transistor having a gate electrode connected to a second emission control line, a first electrode connected to the seventh node, and a second electrode connected to the first electrode of the first light emitting element.

16. The display device according to claim 15, wherein the second circuit unit further comprises:

a second capacitor connected between the fourth node and the fifth node; and an eighteenth transistor having a gate electrode connected to the second initialization line, a first electrode connected to the first electrode of the first light emitting element, and a second electrode connected to a second electrode of the first light emitting element and a third power line.

17. The display device according to claim 15, wherein the second circuit unit further comprises:

a second capacitor having a first electrode, and a second electrode connected to the fifth node;

a fifteenth transistor connected between the seventh node and the fourteenth transistor, and having a gate electrode connected to the fourth node;

a sixteenth transistor having a gate electrode connected to the first emission control line, a first electrode connected to the second power line, and a second electrode connected to the first electrode of the second capacitor;

a seventeenth transistor having a gate electrode connected to the second initialization line, a first electrode connected to the first power line, and a second electrode connected to the first electrode of the second capacitor; and an eighteenth transistor having a gate electrode connected to the second initialization line, a first electrode connected to the first electrode of the first light emitting element, and a second electrode connected to a second electrode of the first light emitting element and a third power line.

18. A tiled display device comprising:

a plurality of display devices; and a seam portion between the plurality of display devices, wherein a first display device from among the plurality of display devices comprises:

first sub-pixels, each of the first sub-pixels comprising a first light emitting element of a first color; and second sub-pixels, each of the second sub-pixels comprising a second light emitting element of a second color different from the first color, wherein each of the first sub-pixels comprises:

a first circuit unit configured to control a supply period of a driving current in response to a first data signal supplied from a first data line in a normal period and in a sensing period;

a second circuit unit configured to supply the driving current to the first light emitting element in response to a second data signal supplied from a second data line in the normal period; and a sensing transistor having a first electrode connected to a first electrode of the first light emitting element, a second electrode directly connected to the second data line, and a gate electrode connected to a sensing line, wherein in a first period of the sensing period, a reference power as the second data signal is supplied to the second data line, wherein in a second period of the sensing period, a voltage level of the second data line is changed, wherein the second period of the sensing period is later than the first period of the sensing period, and wherein in the first period and the second period of the sensing period, the first data signal corresponding to a white grayscale is supplied to the first data line.

19. The tiled display device according to claim 18, wherein the first light emitting element and the second light emitting element are flip chip type of micro light emitting diode elements.

20. The tiled display device according to claim 18, wherein the first display device further comprises a substrate supporting the first sub-pixels and the second sub-pixels on a first surface.

21. The tiled display device according to claim 20, wherein the first display device further comprises:

a pad on the first surface of the substrate;

a connection line on a second surface opposite to the first surface of the substrate; and a side line connecting the pad and the connection line while covering a portion of a side surface of the substrate.

22. The tiled display device according to claim 21, further comprising:

a flexible film on the second surface of the substrate and electrically connected to the side line.

23. The tiled display device according to claim 22, wherein a source driving circuit comprising a first data driver configured to supply the first data signal to the first data line and a second data driver configured to supply the second data signal to the second data line located on the flexible film.

* * * * *